(12) United States Patent
Sakamoto (10) Patent No.: US 10,106,735 B2
(45) Date of Patent: Oct. 23, 2018

(54) RED PHOSPHOR

(71) Applicant: Nichia Corporation, Anan-shi, Tokushima (JP)

(72) Inventor: Masafumi Sakamoto, Anan (JP)

(73) Assignee: NICHIA CORPORATION, Anan-Shi (JP)

( * ) Notice: Subject to any disclaimer, the term of this patent is extended or adjusted under 35 U.S.C. 154(b) by 367 days.

(21) Appl. No.: 15/008,210

(22) Filed: Jan. 27, 2016

(65) Prior Publication Data

US 2016/0215210 A1  Jul. 28, 2016

(30) Foreign Application Priority Data

Jan. 28, 2015 (JP) .................................. 2015-014567
Jul. 14, 2015 (JP) .................................. 2015-140779

(51) Int. Cl.
 *C09K 11/66* (2006.01)
(52) U.S. Cl.
 CPC .................................. *C09K 11/663* (2013.01)
(58) Field of Classification Search
 CPC .................................................... C09K 11/663
 See application file for complete search history.

(56) References Cited

U.S. PATENT DOCUMENTS

| | | | | |
|---|---|---|---|---|
| 9,653,658 | B2 * | 5/2017 | Hosokawa | ............ H01L 33/502 |
| 2006/0169998 | A1 | 8/2006 | Radkov et al. | |
| 2015/0349213 | A1 * | 12/2015 | Hosokawa | ............ H01L 33/502 |
| | | | | 257/98 |
| 2016/0097495 | A1 * | 4/2016 | Yamamoto | ............ G02B 6/0073 |
| | | | | 349/65 |

FOREIGN PATENT DOCUMENTS

| | | | |
|---|---|---|---|
| CN | 102585812 A | | 7/2012 |
| JP | H10-102054 A | | 4/1998 |
| JP | 2008-202044 A | | 9/2008 |
| JP | 2011-6501 | * | 1/2011 |
| JP | 2011-006501 A | | 1/2011 |
| JP | 2013-159718 A | | 8/2013 |
| JP | 2015-113431 | * | 6/2015 |
| JP | 2015-113431 A | | 6/2015 |

OTHER PUBLICATIONS

Translation of JP 2011-6501, Jan. 13, 2011.*

* cited by examiner

*Primary Examiner* — C Melissa Koslow
(74) *Attorney, Agent, or Firm* — Foley & Lardner LLP (57) ABSTRACT

The present disclosure provides a red phosphor represented by formula (1):

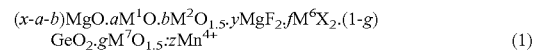

where x, y, z, a, b, f, and g satisfy $1.144 < x \leq 11.0$, $0 < y < 1.597$, $0 < z < 0.1$, $0 < a < 1.0$, $0 \leq b \leq 1.0$, $0 < f \leq 2.0$, $0 \leq g < 0.484$, $1.144 < (x-a-b)$, and b and g satisfy $b+g \neq 0$; $M^1$ is at least one element selected from the group consisting of Ca, Sr, Ba, and Zn; $M^2$ is at least one element selected from the group consisting of Sc, Y, La, Ce, Pr, Nd, Pm, Sm, Eu, Gd, Tb, Dy, Ho, Er, Tm, Yb, and Lu; $M^6$ is at least one element selected from the group consisting of Mg, Ca, Sr, Ba, and Zn; $M^7$ is at least one element selected from the group consisting of B, Al, Ga, and In; and X is at least one element selected from the group consisting of F, Cl, Br, and I, and $M^6X_2$ is other than $MgF_2$.

21 Claims, 3 Drawing Sheets

RED PHOSPHOR

CROSS-REFERENCE TO RELATED APPLICATION

This application claims priority to Japanese Patent Application No. 2015-014567, filed on Jan. 28, 2015, and No. 2015-140779 filed on Jul. 14, 2015. The entire disclosure of Japanese Patent Application No. 2015-014567 and No. 2015-140779 are hereby incorporated herein by reference.

BACKGROUND

1. Technical Field

The present disclosure relates to a red phosphor.

2. Description of the Related Art

A light emitting diode is a semiconductor light emitting element produced from a metal compound such as gallium nitride (GaN). Combining such a semiconductor light emitting element and a phosphor, various light emitting devices to emit light of a while color, an incandescent lamp color, an orange color and so on have been developed. Those light emitting devices to emit a white light and so on can be obtained based on the principle of light-color mixing. As for the system to emit a white light, there are known systems such as a system which employs an ultraviolet-light emitting element and three types of phosphors which emit lights of a red color (R), green color (G), and blue color (B), respectively, and a system which employs a blue-light emitting element and a yellow-light emitting phosphor. Light emitting devices of the type which employ a blue-light emitting element and a phosphor to emit yellow light etc., are in demand in a wide range of fields such as general lighting, on-vehicle lighting, displays, backlights for liquid crystal devices. Of those, for the phosphors used for backlights for liquid crystal, in order to reproduce a wide range of colors on a chromaticity diagram, high color purity is also demanded along with the light emitting efficiency. Particularly, the phosphors used for backlights for liquid crystal devices are required to have compatibility in combination with a filter, and a phosphor with a narrow half width of the emission peak has been in demand.

For example, as for red phosphors having an excitation band in blue-region and an emission peak with a narrow half width, fluoride phosphors having compositions such as $K_2SiF_6:Mn^{4+}$, $K_2TiF_6:Mn^{4+}$, $K_2SnF_6:Mn^{4+}$, $Na_2TiF_6:Mn^{4+}$, $Na_2ZrF_6:Mn^{4+}$, $K_2Si_{0.5}Ge_{0.5}F_6:Mn^{4+}$ etc., are described in published Japanese translation of PCT international publication for patent application No. 2009-528429.

As for a red phosphor having an emission peak with a narrow half width, a phosphor (hereinafter may be referred to as a "MGF phosphor") having a composition formula of $3.5MgO \cdot 0.5MgF_2 \cdot GeO_2:Mn^{4+}$ is known. The MGF phosphors are known as red phosphors that are excited by light having a wavelength of about 254 nm from a mercury lamp. The MGF phosphors can be formed through calcination at about 1200° C., under atmospheric pressure, and thus have an advantage of facilitating manufacturing.

In Japanese unexamined patent publication No. 2008-202044, a red phosphor is described in which $MgF_2$ in a MGF phosphor is entirely substituted by $AF_2$ (A is Ca, Sr, Ba, or Zn, or a mixture of those). Also, in Example 3 in Japanese unexamined patent publication No. 2008-202044, a red phosphor is described in which a luminous efficiency excited by light of a wavelength of 400 nm is improved to a maximum of 143% compared to that of the MGF phosphor.

A MGF phosphor has a high luminous efficiency when excited by light having a wavelength of about 254 nm from a mercury lamp. Meanwhile, the luminous efficiency of the MGF phosphor tends to decrease when excited by light having a wavelength in a range of 350 to 500 nm.

SUMMARY

Accordingly, an aim of one embodiment of the present disclosure is to provide a red phosphor that has fundamental properties of a MGF phosphor and exhibits a high luminous efficiency when excited by light having a wavelength in a range of 350 to 500 nm.

The inventor of the present invention has solved the above disadvantage by substituting a portion of the constituent elements of a MGF phosphor by other elements.

The present disclosure includes embodiments as described below.

A red phosphor represented by formula (1):

$$(x-a-b)MgO \cdot aM^1O \cdot bM^2O_{1.5} \cdot yMgF_2 \cdot fM^6X_2 \cdot (1-g)GeO_2 \cdot gM^7O_{1.5}:zMn^{4+} \quad (1)$$

where x, y, z, a, b, f, and g satisfy $1.144 < x \leq 11.0$, $0 < y < 1.597$, $0 < z < 0.1$, $0 < a < 1.0$, $0 \leq b \leq 1.0$, $0 < f \leq 2.0$, $0 \leq g < 0.484$, $1.144 < (x-a-b)$ and further, b and g satisfy $b+g \neq 0$;

$M^1$ is at least one element selected from the group consisting of Ca, Sr, Ba, and Zn;

$M^2$ is at least one element selected from the group consisting of Sc, Y, La, Ce, Pr, Nd, Pm, Sm, Eu, Gd, Tb, Dy, Ho, Er, Tm, Yb, and Lu;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and where $M^6X_2$ is other than $MgF_2$.

The present disclosure includes embodiments as described below.

A red phosphor represented by formula (2):

$$(x-b)MgO \cdot bM^2O_{1.5} \cdot yMgF_2 \cdot fM^6X_2 \cdot (1-g)GeO_2 \cdot gM^7O_{1.5}:zMn^{4+} \quad (2)$$

where x, y, z, b, f, and g satisfy $1.144 < x \leq 11.0$, $0 < y < 1.597$, $0 < z < 0.1$, $0 \leq b \leq 1.0$, $0 < f \leq 2.0$, $0 \leq g < 0.484$, $1.144 < (x-b)$, and further, b and g satisfy $b+g \neq 0$;

$M^2$ is at least one element selected from the group consisting of Sc, Y, La, Ce, Pr, Nd, Pm, Sm, Eu, Gd, Tb, Dy, Ho, Er, Tm, Yb, and Lu;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and where $M^6X_2$ is other than $MgF_2$.

The present disclosure includes embodiments as described below.

A red phosphor represented by formula (3):

$$(x-c)MgO \cdot cM^3O_{0.5} \cdot yMgF_2 \cdot fM^6X_2 \cdot (1-g)GeO_2 \cdot gM^7O_{1.5}:zMn^{4+} \quad (3)$$

where x, y, z, c, f, and g satisfy $1.144 < x \leq 11.0$, $0 < y < 1.597$, $0 < z < 0.1$, $0 < c \leq 1.0$, $0 < f \leq 2.0$, $0 \leq g < 0.484$, $1.144 < (x-c)$;

$M^3$ is at least one element selected from the group consisting of Li, Na, and K;
$M^6$ is at least one element selected from the group consisting of Mg, Ca, Sr, Ba, and Zn;
$M^7$ is at least one element selected from the group consisting of B, Al, Ga, and In; and
X is at least one element selected from the group consisting of F, Cl, Br, and I; and
where $M^6X_2$ is other than $MgF_2$.

The present disclosure includes embodiments as described below.

A red phosphor represented by formula (4):

$$(x-d)MgO.dM^4O_{2.5}.yMgF_2.fM^6X_2.(1-g)GeO_2.gM^7O_{1.5}:zMn^{4+} \quad (4)$$

where x, y, z, d, f, and g satisfy $1.144 < x \leq 11.0$, $0 < y < 1.597$, $0 < z < 0.1$, $0 < d \leq 1.0$, $0 < f \leq 2.0$, $0 \leq g < 0.484$, $1.144 < (x-d)$;
$M^4$ is at least one element selected from the group consisting of V, Nb, and Ta;
$M^6$ is at least one element selected from the group consisting of Mg, Ca, Sr, Ba, and Zn;
$M^7$ is at least one element selected from the group consisting of B, Al, Ga, and In; and
X is at least one element selected from the group consisting of F, Cl, Br, and I; and
where $M^6X_2$ is other than $MgF_2$.

The present disclosure includes embodiments as described below.

A red phosphor represented by formula (5):

$$(x-e)MgO.eM^5O_3.yMgF_2.fM^6X_2.(1-g)GeO_2.gM^7O_{1.5}:zMn^{4+} \quad (5)$$

where x, y, z, e, f, and g satisfy $1.44 < x \leq 11.0$, $0 < y < 1.597$, $0 < z < 0.1$, $0 < e \leq 1.0$, $0 < f \leq 2.0$, $0 \leq g < 0.484$, $1.144 < (x-e)$;
$M^5$ is at least one element selected from the group consisting of Cr, Mo, and W;
$M^6$ is at least one element selected from the group consisting of Mg, Ca, Sr, Ba, and Zn;
$M^7$ is at least one element selected from the group consisting of B, Al, Ga, and In; and
X is at least one element selected from the group consisting of F, Cl, Br, and I; and
where $M^6X_2$ is other than $MgF_2$.

According to the embodiments described above, a red phosphor that has fundamental properties of a MGF phosphor and exhibits a high luminous efficiency when excited by light having a wavelength in a range of 350 to 500 nm can be provided.

DETAILED DESCRIPTION OF EMBODIMENT

Certain embodiments according to the present disclosure will be described below. The embodiments shown below are intended as illustrative of a red phosphor and a light emitting device using the same to give a concrete form to technical ideas of the present invention, and the scope of the invention is not limited to those described below.

In the specification, the relation between the color names and the chromaticity coordinates, the relation between the ranges of wavelength of light and the color names of single color light, and the like conform to JIS Z8110. More specifically, the wavelengths of 380 nm to 410 nm correspond to purple light, 410 nm to 455 nm correspond to blue purple light, 455 nm to 485 nm correspond to blue light, 485 nm to 495 nm correspond to blue green light, 495 nm to 548 nm correspond to green light, 548 nm to 573 nm correspond to yellow green light, 573 nm to 584 nm correspond to yellow light, 584 nm to 610 nm correspond to yellow red light, and 610 nm to 780 nm correspond to red light.

In the specification, the term "process" refers not only an independent process but also a process which is indistinguishable from other processes but which can achieve an intended purpose. Also, a numerical range indicated using "to" in the present specification represents a range including numerical values described before and after "to" as a minimum value and a maximum value, respectively. Further, the content of each component in the composition indicates that in the case where a plural number of substances corresponding to each component are present in the composition, refers to a total amount of the plural number of substance in the composition.

The inventor of the present invention discovered that a red phosphor obtained by substituting a portion of $MgF_2$ in the composition of a MGF phosphor by $M^6X_2$ (a compound in which $M^6$ is Mg, Ca, Sr, Ba, or Zn, and X is F, Cl, Br, or I), and also substituting a portion of Mg of MgO in the composition of the MGF phosphor by $M^1$ (Ca, Sr, Ba, or Zn), $M^2$ (Sc, Y, La, Ce, Pr, Nd, Pm, Sm, Eu, Gd, Tb, Dy, Ho, Er, Tm, Yb, or Lu), $M^3$ (Li, Na, or K), $M^4$ (V, Nb, or Ta), or $M^5$ (Cr, Mo, or W), or substituting a portion of Ge of $GeO_2$ in the composition of a MGF phosphor by $M^7$ (B, Al, Ga, or In) has a luminous efficiency higher than the luminous efficiency of the MGF phosphor. Further, the inventor of the present invention discovered that some of the red phosphors obtained by substituting a portion of $MgF_2$ in the composition of a MGF phosphor by $M^6X_2$, substituting a portion of Mg of MgO in the composition of a MGF phosphor by $M^2$ or $M^2$ and $M^1$, substituting a portion of Ge of $GeO_2$ in the composition of a MGF phosphor by $M^7$, have a luminous efficiency at a wavelength range of 600 to 670 nm exceeding 200% with respect to the luminous efficiency of the MGF phosphor.

Details of the first red phosphor to the fifth red phosphor will be described below.

Red Phosphor
First Red Phosphor
A first red phosphor can be represented by following formula (1):

$$(x-a-b)MgO.aM^1O.bM^2O_{1.5}.yMgF_2.fM^6X_2.(1-g)GeO_2.gM^7O_{1.5}:zMn^{4+} \quad (1)$$

where x, y, z, a, b, f, and g satisfy $1.144 < x \leq 1.0$, $0 < y < 1.597$, $0 < z < 0.1$, $0 < a < 1.0$, $0 \leq b \leq 1.0$, $0 < f \leq 2.0$, $0 \leq g < 0.484$, $1.144 < (x-a-b)$, and further, b and g satisfy $b+g \neq$;
$M^1$ is at least one element selected from the group consisting of Ca, Sr, Ba, and Zn;
$M^2$ is at least one element selected from the group consisting of Sc, Y La, Ce, Pr, Nd, Pm, Sm, Eu, Gd, Tb, Dy, Ho, Er, Tm, Yb, and Lu;
$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of Ca, Sr, Ba, and Zn; and where $M^6X_2$ is other than $MgF_2$.

In the formula (1), the variables a, b, f, and g satisfy $0<a<1.0$, $0\leq b\leq 1.0$, $0<f\leq 2.0$, and $0\leq g<0.484$, and further, b and g satisfy $b+g\neq 0$. That is, the first red phosphor has a MGF-phosphor composition in which $MgF_2$ is partially substituted by $M^6X_2$, a portion of Mg in MgO is substituted by $M^1$, a portion of Mg in MgO is substituted by $M^2$, and/or a portion of Ge in $GeO_2$ is substituted by $M^7$.

$aM^1O$ $M^1O$ is a component for partially substituting MgO. $M^1$ is at least one element selected from the group consisting of Ca, Sr, Ba, and Zn, in which Ca, Sr, or Zn is preferable. The variable a preferably satisfies $0<a<1.0$, and preferably satisfies $0.094\leq a\leq 0.462$. With the variable a satisfying $0.094\leq a\leq 0.462$, the luminous efficiency can be further increased.

$bM^2O_{1.5}$ $M^2O_{1.5}$ is a component for partially substituting MgO. $M^2$ is at least one element selected from the group consisting of Sc, Y, La, Ce, Pr, Nd, Pm, Sm, Eu, Gd, Tb, Dy, Ho, Er, Tm, Yb, and Lu, in which Sc or Lu is preferable and Sc is more preferable. The variable b satisfies $0\leq b\leq 1.0$. The variable preferably satisfies $0<b\leq 1.0$, and more preferably satisfies $0<b\leq 0.495$. Thus, it is more preferable that $M^2$ is Sc and b satisfies $0<b\leq 0.495$. Further, it is more preferable that with the variable b satisfying $0.001\leq b\leq 0.320$, more preferably satisfying $0.006\leq b\leq 0.320$, the luminous efficiency can be further increased.

Variable x

The variable x satisfies $1.144<x\leq 11.0$. The variable x represents a total amount of the MgO site in the red phosphor. The variable x preferably satisfies $2.422\leq x\leq 5.189$. With the variable x satisfying $2.925\leq x\leq 3.1$, the luminous efficiency can be further increased and thus more preferable. In the first red phosphor, the variables x, a, and b satisfy $1.144<(x-a-b)$ and preferably satisfy $2.422\leq (x-a-b)\leq 5.189$. With (x-a-b) equal or smaller than 1.144, an excessive amount of $M^1O$ or $M^1O$ and $M^2O_{1.5}$ is substituted in the MgO site, resulting in a small luminous efficiency.

Variable y

The variable y represents the amount of $MgF_2$. The variable y satisfies $0<y<1.597$. With the variable y exceeding 1.597, an excess amount of $MgF_2$ is provided, resulting in a low luminous efficiency. Meanwhile, with the variable y of zero, properties typically to a MGF phosphor cannot be exhibited, resulting in a low luminous efficiency. Thus, the variable y preferably satisfies $0.160\leq y\leq 1.213$. With the variable y satisfying $0.403\leq y\leq 0.856$, the luminous efficiency can be further increased and thus more preferable.

$fM^6X_2$ $M^6X_2$ is a component for partially substituting $MgF_2$. $M^6$ is at least one element selected from the group consisting of Mg, Ca, Sr, Ba, and Zn, in which Ca, Sr, Ba or Zn is preferable, and Ca is more preferable. X is at least one element selected from the group consisting of F, Cl, Br, and I, in which Cl or Br is preferable and Cl is more preferable. $M^6X_2$ is preferably $MgCl_2$, $CaCl_2$, $SrCl_2$, $BaCl_2$, $ZnCl_2$, $MgBr_2$, or $CaBr_2$, and $CaCl_2$ is more preferable. That is, it is more preferable that $M^6$ is Ca and X is Cl.

The variable f satisfies $0<f\leq 2.0$, preferably satisfies $0<f\leq 1.472$, and more preferably satisfies $0<f<1.472$. With the variable f satisfying $0.296\leq f\leq 0.852$, the luminous efficiency can be further increased and thus more preferable.

In the case where $M^6X_2$ is not $CaCl_2$, the variable f satisfying $0<f\leq 0.210$, the luminous efficiency can be further increased and thus more preferable.

As for the variables y and f, "y+f" correspond to a total amount of $MgF_2$ site in the MGF phosphor. The variables y and f satisfy $0<y+f<3.597$, preferably satisfy $0<y+f\leq 3.0$, and more preferably satisfy $0<y+f\leq 2.25$.

$gM^7O_{1.5}$ $gM^7O_{1.5}$ is a component for substituting $GeO_2$. $M^7$ is at least one element selected from the group consisting of B, Al, Ga, and In, and In or Ga is preferable and Ga is more preferable. The variable g satisfies $0\leq g<0.484$, preferably satisfies $0<g\leq 0.295$, and more preferably satisfies $0.003\leq g\leq 0.295$. Thus, it is preferable that $M^7$ is Ga and g satisfies $0<g\leq 0.295$, and it is more preferable that $M^7$ is Ga and g satisfies $0.003\leq g\leq 0.295$. Further, with the variable g satisfying $0.035\leq y\leq 0.093$, the luminous efficiency can be further increased and thus more preferable.

Variable z

The variable z represents an amount of $Mn^{4+}$. The variable z satisfies $0<z<0.1$. With the variable z being 0.1 or greater, an excessive amount of $Mn^{4+}$ is provided, resulting in a significant decrease in the luminous efficiency. Thus, the variable z preferably satisfies $0.001\leq z\leq 0.049$. With the variable z satisfying $0.008\leq z\leq 0.026$, the luminous efficiency can be further increased and thus more preferable.

Preferable Combination

In the first red phosphor, a preferable combination can be shown below.

$M^2$ is Sc or Lu and X is Cl or Br.

The variable a satisfies $0.094\leq a\leq 0.462$, $M^2$ is Sc or Lu, and X is Cl or Br.

More preferable combination in the first red phosphor can be shown below.

$M^1$ is at least one element selected from the group consisting of Ca, Sr, Ba, and Zn, a satisfies $0.094\leq a\leq 0.462$; $M^2$ is Sc, b satisfies $0<b\leq 0.495$; $M^6$ is Ca, X is Cl, f satisfies $0<f\leq 1.472$; $M^7$ is Ga, g satisfies $0<g\leq 0.295$; and z satisfies $0<z<0.1$.

Second Red Phosphor

A second red phosphor can be represented by following formula (2)

$$(x-b)MgO \cdot bM^2O_{1.5} \cdot yMgF_2 \cdot fM^6X_2 \cdot (1-g)GeO_2 \cdot gM^7O_{1.5} \cdot zMn^{4+} \quad (2)$$

where x, y, z, b, f, and g satisfy $1.144<x\leq 11.0$, $0<y<1.597$, $0<z<0.1$, $0\leq b\leq 1.0$, $0<f\leq 2.0$, $0\leq g<0.484$, $1.144<(x-b)$, and further, b and g satisfy $b+g\neq 0$;

$M^2$ is at least one element selected from the group consisting of Sc, Y, La, Ce, Pr, Nd, Pm, Sm, Eu, Gd, Tb, Dy, Ho, Er, Tm, Yb, and Lu;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I, and where $M^6X_2$ is other than $MgF_2$.

In the second red phosphor, the variables b, f, and g satisfy $0\leq b\leq 1.0$, $0<f\leq 2.0$, and $0\leq g<0.484$, and further, b and g satisfy $b+g\neq 0$. That is, the second red phosphor has a composition of a MGF phosphor in which a portion of $MgF_2$ is substituted by $M^6X_2$, and a portion of Mg of MgO is substituted by $M^2$, and/or a portion of Ge of $GeO_2$ is substituted by $M^7$.

In the second red phosphor, x, y, z, b, f, and g are, including the preferred embodiments, as those described in the first red phosphor. In the second red phosphor, the variables x and b satisfy $1.144<(x-b)$ and preferably satisfy $2.422\leq(x-b)\leq5.189$. With (x-b) equal or lower than 1.144, an excessive amount of $M^2O_{1.5}$ is substituted in the MgO site, resulting in a small luminous efficiency.

Preferable Combination

In the second red phosphor, a preferable combination can be shown below.

$M^2$ is Sc or Lu and X is Cl or Br.

More preferable combinations in the second red phosphor can be shown below.

$M^2$ is Sc, b satisfies $0<b\leq0.495$; $M^6$ is Ca, X is Cl, f satisfies $0<f\leq1.472$; z satisfies $0<z<0.1$; and g=0. $M^6$ is Ca, X is Cl, and f satisfies $0<f\leq1.472$; $M^7$ is Ga, g satisfies $0<g\leq0.295$; z satisfies $0<z<0.1$; and b=0.

$M^2$ is Sc and b satisfies $0<b\leq0.495$; $M^6$ is Ca, X is Cl, and f satisfies $0<f\leq1.472$; $M^7$ is Ga and g satisfies $0<g\leq0.295$; and z satisfies $0<z<0.1$.

$M^2$ is Sc and b satisfies $0<b\leq0.4958$; $M^6$ is at least one element selected from the group consisting of Mg, Ca, Sr, Ba, and Zn; X is Cl or Br and f satisfies $0<f\leq1.472$; $M^7$ is Ga, and g satisfies $0<g\leq0.295$; and z satisfies $0<z<0.1$.

Third Red Phosphor

A third red phosphor can be represented by following formula (3):

$$(x-c)MgO.cM^3O_{0.5}.yMgF_2.fM^6X_2.(1-g)GeO_2.gM^7O_{1.5}:zMn^{4+} \quad (3)$$

where x, y, z, c, f, and g satisfy $1.144<x\leq11.0$, $0<y<1.597$, $0<z<0.1$, $0<c\leq1.0$, $0<f\leq2.0$, $0\leq g<0.484$, $1.144<(x-c)$;

$M^3$ is at least one element selected from the group consisting of Li, Na, and K;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and where $M^6X_2$ is other than $MgF_2$.

In the formula (3), the variables c, f, and g satisfy $0<c\leq1.0$, $0<f\leq2.0$, and $0\leq g<0.484$. That is, the third red phosphor has a composition of a MGF phosphor in which a portion of $MgF_2$ is substituted by $M^6X_2$, and a portion of Mg of MgO is substituted by $M^3$, and when appropriate, a portion of Ge of $GeO_2$ is substituted by $M^7$.

$cM^3O_{0.5}$ $M^3O_{0.5}$ is a component for substituting MgO. $M^3$ is at least one element selected from the group consisting of Li, Na, and K, and K is preferable. The variable c satisfies $0<c\leq1.0$, and preferably satisfy $0<c<0.495$. With the variable c satisfying $0.001\leq c\leq0.320$, preferably satisfying $0.006\leq c\leq0.320$, the luminous efficiency can be further increased, and thus more preferable.

In the third red phosphor, x, y, z, f, and g are, including the preferred embodiments, as those described in the first red phosphor. In the third red phosphor, the variables x and c satisfy $1.144<(x-c)$ and preferably satisfy $2.422\leq(x-c)\leq5.189$. With (x-c) equal or smaller than 1.144, an excessive amount of $M^3O_{0.5}$ is substituted in the MgO site, resulting in a small luminous efficiency.

Preferable Combination

In the third red phosphor, a preferable combination can be shown below.

$M^3$ is K and X is Cl or Br.

Fourth Red Phosphor

A fourth red phosphor can be represented by following formula (4).

$$(x-d)MgO.dM^4O_{2.5}.yMgF_2.fM^6X_2.(1-g)GeO_2.gM^7O_{1.5}:zMn^{4+} \quad (4)$$

where x, y, z, d, f, and g satisfy $1.144<x\leq11.0$, $0<y<1.597$, $0<z<0.1$, $0<d\leq1.0$, $0<f\leq2.0$, $0\leq g<0.484$, $1.144<(x-d)$;

$M^4$ is at least one element selected from the group consisting of V, Nb, and Ta;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and where $M^6X_2$ is other than $MgF_2$.

In the formula (4), the variables d, f, and g satisfy $0<d\leq1.0$, $0<f\leq2.0$, and $0\leq g<0.484$. That is, the fourth red phosphor has a composition of a MGF phosphor in which a portion of $MgF_2$ is substituted by $M^6X_2$, a portion of Mg of MgO is substituted by $M^4$, and when appropriate, a portion of Ge of $GeO_2$ is substituted by $M^7$.

$dM^4O_{2.5}$ $M^4O_{2.5}$ is a component for substituting MgO. $M^4$ is at least one element selected from the group consisting of V, Nb, and Ta, and Ta is preferable.

The variable d satisfies $0<d\leq1.0$, and preferably satisfy $0<d<0.495$. With the variable d satisfying $0.001\leq d\leq0.320$, preferably satisfying $0.006\leq d\leq0.320$, the luminous efficiency can be further increased, and thus more preferable.

In the fourth red phosphor, x, y, z, f, and g are, including the preferred embodiments, as those described in the first red phosphor.

In the fourth red phosphor, the variables x and d satisfy $1.144<(x-d)$ and preferably satisfy $2.422\leq(x-d)\leq5.189$. With (x-d) equal or smaller than 1.144, an excessive amount of $M^4O_{2.5}$ is substituted in the MgO site, resulting in a small luminous efficiency.

Preferable Combination

In the fourth red phosphor, a preferable combination can be shown below.

$M^4$ is Ta and X is Cl or Br.

Fifth Red Phosphor

A fifth red phosphor can be represented by following formula (5):

$$(x-e)MgO.eM^5O_3.yMgF_2.fM^6X_2.(1-g)GeO_2.gM^7O_{1.5}:zMn^{4+} \quad (5)$$

where x, y, z, e, f, and g satisfy $1.44<x\leq11.0$, $0<y<1.597$, $0<z<0.1$, $0<e\leq1.0$, $0<f\leq2.0$, $0\leq g<0.484$, $1.144<(x-e)$;

$M^5$ is at least one element selected from the group consisting of Cr, Mo, and W;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and where $M^6X_2$ is other than $MgF_2$.

In the formula (5), the variables e, f, and g satisfy $0<e\leq1.0$, $0<f\leq2.0$, and $0\leq g<0.484$. That is, the fifth red phosphor has a composition of a MGF phosphor in which a portion of $MgF_2$ is substituted by $M^6X_2$, a portion of Mg of MgO is substituted by $M^5$, and when appropriate, a portion of Ge of $GeO_2$ is substituted by $M^7$.

eM⁵O₃

$eM^5O_3$ is a component for partially substituting MgO. $M^5$ is at least one element selected from the group consisting of Cr Mo, and W and Mo is preferable. The variable e satisfies $0 < e \leq 1.0$, and preferably satisfy $0 < e < 0.495$. Further, with the variable e satisfying $0.001 \leq e \leq 0.320$, preferably satisfying $0.006 \leq e \leq 0.320$, the luminous efficiency can be further increased and thus further preferable.

In the fifth red phosphor, x, y, z, f, and g are, including the preferred embodiments, as those described in the first red phosphor.

In the fifth red phosphor, the variables x and e satisfy $1.144 < (x-e)$ and preferably satisfy $2.422 \leq (x-e) \leq 5.189$. With (x-e) equal or smaller than 1.144, an excessive amount of $M^5O_3$ is substituted in the MgO site, resulting in a small luminous efficiency.

Preferable Combination

In the fifth red phosphor, a preferable combination can be shown below.

$M^5$ is Mo and X is Cl or Br.

Method of Manufacturing Red Phosphor

The red phosphor can be manufactured through a method that includes mixing starting raw materials to obtain a raw material mixture, and heat treating the raw material mixture to obtain a calcined product.

Examples of the starting raw materials include an oxide, a hydroxide, a fluoride, a bromide, an iodide, a chloride, and a carbonate of elements that constitutes the red phosphor. Each of the raw starting materials is weighed based on the composition ratio of the red phosphor to obtain. The mixing can be carried out by using a known mixing device. Examples of such a known mixing device include a high-speed shear-type mixer, a ball mill, a V-type mixer, and a stirring blender.

The mixed raw material is charged in a calcining vessel such as a crucible and heat-treated to obtain a calcined product. The heat treatment can be performed in an air atmosphere, an N₂ atmosphere, or an Ar atmosphere, and an air atmosphere is preferable.

The temperature of the heat treatment can be set appropriately and which is preferably in a range of 1000° C. to 1400° C., and more preferably in a range of 1000° C. to 1300° C. The heat treatment at a temperature of 1000° C. or greater can accelerate the reaction of the raw materials. Also, the heat treatment at a temperature of 1400° C. or lower can reduce possibilities of fluctuation in the composition due to melting of the raw material or the calcined product or to volatilization of a portion of the raw materials.

The length of the heat treatment can be in a range of 0.5 to 20 hours, and preferably in a range of 4 to 12 hours. The reaction of the raw materials can be accelerated with the heat treatment of 0.5 hours or longer. Meanwhile, the heat treatment of 20 hours or less can reduce the possibilities of fluctuation in the composition due to melting of the raw material or the calcined product or to volatilization of a portion of the raw materials.

Accordingly, the red phosphor can be obtained. The amount of each element of the red phosphor substantially corresponds to the charging ratio of its raw material.

EXAMPLES

The examples below illustrate certain embodiments of the present disclosure in detail. However, the embodiments are not limited to those illustrated below.

Examples 1-20 and 27-45 each illustrates a second red phosphor. Examples 21-26 each illustrates a first red phosphor. Example 46 illustrates a third red phosphor. Example 47 illustrates a fourth red phosphor. Example 48 illustrates a fifth red phosphor.

Examples 1-13, Comparative Examples 2, 3

For the raw materials, MgO, MgF₂, CaCl₂, GeO₂, MnCO₃ were exactly weighed. Then, for the raw materials of the elements for substituting MgO or GeO₂, Sc₂O₃ and Ga₂O₃ were exactly weighed. Then, the weighed raw materials were mixed by using a rotation blade type mixing machine. The mixed raw material was calcined in an air atmosphere at a temperature in a range of 1000 to 1300° C., for 4 to 12 hours. Thus, the red phosphors according to Examples 1-13 and Comparative Examples 2 and 3, whose composition formulas are shown in Table 1 were obtained.

Comparative Example 1

A MGF phosphor of Comparative Example, represented by a composition formula $3.5MgO \cdot 0.5MgF_2 \cdot GeO_2 : 0.015Mn^{4+}$ was prepared using the raw materials and calcining conditions as in the Example described above. The MGF phosphor thus obtained was used as the phosphor of Comparative Example 1.

TABLE 1

|  | Substituting Element | Composition Formula |
|---|---|---|
| Example 1 | Sc, CaCl₂ | $3.095MgO \cdot 0.0025Sc_2O_3 \cdot 0.65MgF_2 \cdot 0.25CaCl_2 \cdot GeO_2 : 0.015Mn^{4+}$ |
| Example 2 | Sc, CaCl₂ | $3.05MgO \cdot 0.025Sc_2O_3 \cdot 0.65MgF_2 \cdot 0.25CaCl_2 \cdot GeO_2 : 0.015Mn^{4+}$ |
| Example 3 | Sc, CaCl₂ | $3.0MgO \cdot 0.05Sc_2O_3 \cdot 0.65MgF_2 \cdot 0.25CaCl_2 \cdot GeO_2 : 0.015Mn^{4+}$ |
| Example 4 | Sc, CaCl₂ | $2.8MgO \cdot 0.15Sc_2O_3 \cdot 0.65MgF_2 \cdot 0.25CaCl_2 \cdot GeO_2 : 0.015Mn^{4+}$ |
| Example 5 | Sc, CaCl₂ | $2.6MgO \cdot 0.25Sc_2O_3 \cdot 0.65MgF_2 \cdot 0.25CaCl_2 \cdot GeO_2 : 0.015Mn^{4+}$ |
| Example 6 | Ga, CaCl₂ | $3.1MgO \cdot 0.65MgF_2 \cdot 0.25CaCl_2 \cdot 0.995GeO_2 \cdot 0.0025Ga_2O_3 : 0.015Mn^{4+}$ |
| Example 7 | Ga, CaCl₂ | $3.1MgO \cdot 0.65MgF_2 \cdot 0.25CaCl_3 \cdot 0.95GeO2 \cdot 0.025Ga_2O_3 : 0.015Mn^{4+}$ |
| Example 8 | Ga, CaCl₂ | $3.1MgO \cdot 0.65MgF_2 \cdot 0.25CaCl_2 \cdot 0.90GeO_2 \cdot 0.05Ga_2O_3 : 0.015Mn^{4+}$ |
| Example 9 | Ga, CaCl₂ | $3.1MgO \cdot 0.65MgF_2 \cdot 0.25CaCl_2 \cdot 0.70GeO_2 \cdot 0.15Ga_2O_3 : 0.015Mn^{4+}$ |
| Comparative Example 2 | Ga, CaCl₂ | $3.1MgO \cdot 0.65MgF_2 \cdot 0.25CaCl_2 \cdot 0.50GeO_2 \cdot 0.25Ga_2O_3 : 0.015Mn^{4+}$ |
| Example 10 | Sc, Ga, CaCl₂ | $3.095MgO \cdot 0.0025Sc_2O_3 \cdot 0.65MgF_2 \cdot 0.25CaCl_2 \cdot 0.995GeO_2 \cdot 0.0025Ga_2O_3 : 0.015Mn^{4+}$ |
| Example 11 | Sc, Ga, CaCl₂ | $3.05MgO \cdot 0.025Sc_2O_3 \cdot 0.65MgF_2 \cdot 0.25CaCl_2 \cdot 0.95GeO_2 \cdot 0.025Ga_2O_3 : 0.015Mn^{4+}$ |
| Example 12 | Sc, Ga, CaCl₂ | $3.0MgO \cdot 0.05Sc_2O_3 \cdot 0.65MgF_2 \cdot 0.25CaCl_2 \cdot 0.90GeO_2 \cdot 0.05Ga_2O_3 : 0.015Mn^{4+}$ |
| Example 13 | Sc, Ga, CaCl₂ | $2.8MgO \cdot 0.15Sc_2O_3 \cdot 0.65MgF_2 \cdot 0.25CaCl_2 \cdot 0.70GeO_2 \cdot 0.15Ga_2O_3 : 0.015Mn^{4+}$ |
| Comparative Example 3 | Sc, Ga, CaCl₂ | $2.6MgO \cdot 0.25Sc_2O_3 \cdot 0.65MgF_2 \cdot 0.25CaCl_2 \cdot 0.50GeO_2 \cdot 0.25Ga_2O_3 : 0.015Mn^{4+}$ |
| Comparative Example 1 | — | $3.5MgO \cdot 0.5MgF_2 \cdot 0.985GeO_2 : 0.015Mn^{4+}$ |

Measuring Emission Spectra

Figure 1:
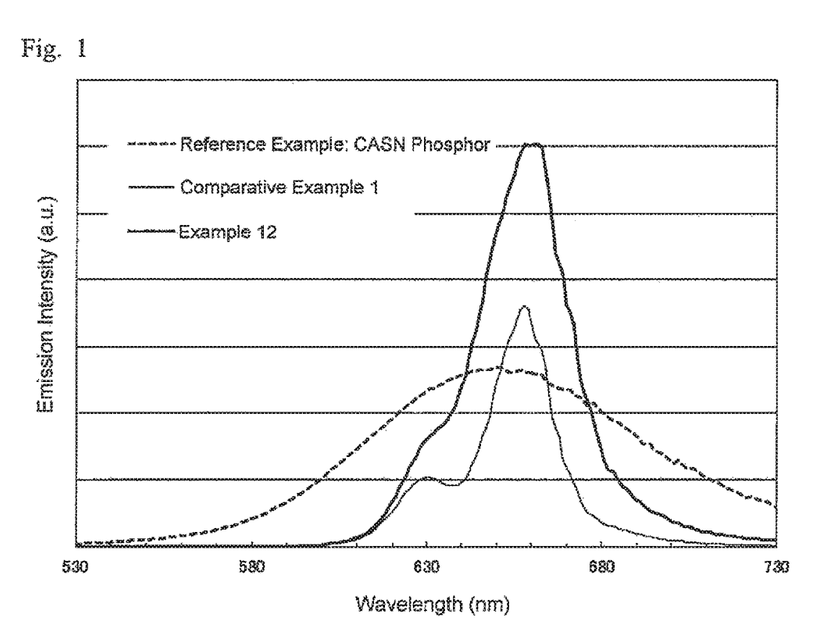
FIG. 1 is a diagram showing emission spectra of the phosphors according to Example 12, Comparative Example 1, and Reference Example.

The emission spectra excited by light of an excitation wavelength in a range of 350 to 500 nm were measured for the red phosphors obtained in Example 12, the MGF phosphor (composition formula: $3.5MgO \cdot 0.5MgF_2 \cdot GeO_2:0.15Mn^{4+}$) of Comparative Example 1, and the CASN phosphor (composition formula: $CaAlSiN_3:Eu^{2+}$) of Reference Example were measured. The results are shown in FIG. 1. As shown in FIG. 1, the red phosphor obtained in Example 12 was excited by light having a wavelength in a range of 350 to 500 nm and emitted light having a wavelength in a wavelength region of 600 to 670 nm. Further, the red phosphor of Example 12 emitted light having a half value width of the emission spectrum smaller than the CASN phosphor shown as a reference example.

Measuring Excitation Spectra

Figure 2:
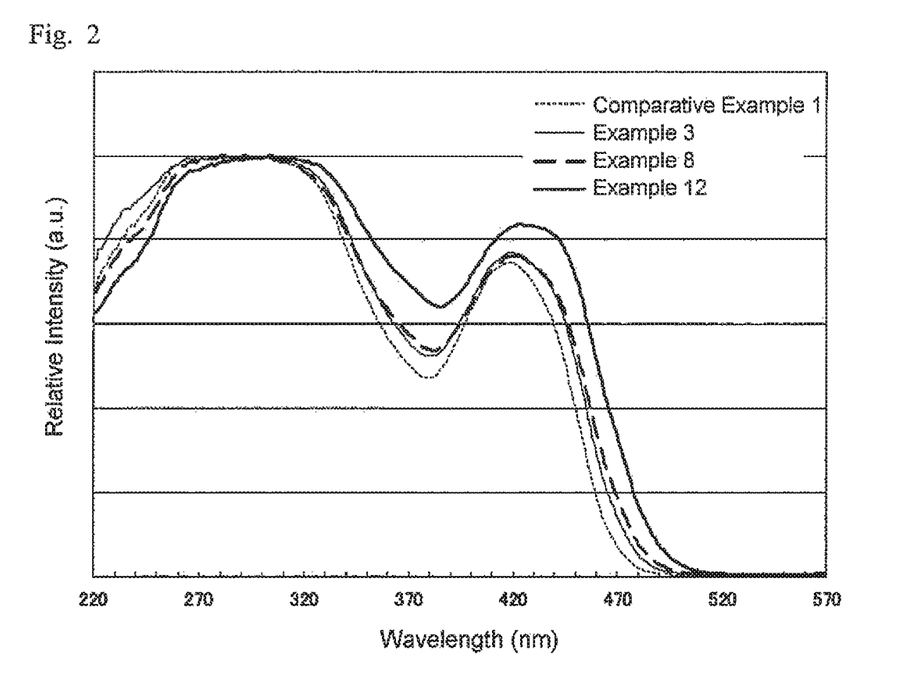
FIG. 2 is a diagram showing excitation spectra of the phosphors according to Examples 3, 8, and 12 and Comparative Example 1.

Excitation spectra of the red phosphors obtained in Examples 3, 8, and 12 and the MGF phosphor of Comparative Example 1 were measured at wavelengths of 220-570 nm. The results are shown in FIG. 2. The red phosphor of Example 3 is obtained by substituting a portion of $MgF_2$ by $CaCl_2$ and substituting a portion of Mg of MgO by Sc (hereinafter may be referred to as "Sc-substituted"). The red phosphor of Example 8 is obtained by substituting a portion of $MgF_2$ by $CaCl_2$ and substituting a portion of $GeO_2$ by $GaO_{1.5}$ (hereinafter may be referred to as "Ga-substituted"). The red phosphor of Example 12 is obtained by substituting a portion of $MgF_2$ by $CaCl_2$, substituting a portion of MgO by $ScO_{1.5}$, and substituting a portion of $GeO_2$ by $GaO_{1.5}$ (hereinafter may be referred to as "Ga—Sc co-substituted"). As shown in FIG. 2, the red phosphors of Examples 3, 8, and 12 exhibited higher relative intensities when excited by the near-ultraviolet light or blue light of wavelengths of 350-500 nm. Particularly, the phosphor of Example 12 is Ga—Sc co-substituted and exhibited a higher relative intensity when excited by the near-ultraviolet light or blue light of wavelengths of 350-500 nm, compared to that of the phosphor of Example 3, which is Sc-substituted, and the phosphor of Example 5, which is Ge-substituted.

Measuring Luminance of Phosphor Powder

Luminance of the powder of the red phosphors of Examples 1-13 and Comparative Examples 2 and 3 were measured at an excitation wavelength of 440 nm, by using a fluorescence spectrophotometer F-4500 (Hitachi High-Technologies Corporation). Relative energy value (relative ENG) of the emission spectrum of each phosphor of examples and comparative examples at an excitation wavelength of 440 nm was determined with an energy value of emission spectrum of the phosphor of Comparative Example 1 (MGF phosphor) set to 100%. The results are shown in Table 3. The energy values are represented in relative integral values in a wavelength range of 460 to 830 nm in the emission spectra, respectively.

Composition of Phosphors

The compositions of the red phosphors of Examples 1-13 and Comparative Examples 2, 3 were analyzed by using an inductive coupling plasma emission analysis (ICP analysis) and a spectrophotometer. The results are shown in Table 3.

TABLE 2

| | Charging Ratio Molar Ratio (mol) | | | | | | | | | |
|---|---|---|---|---|---|---|---|---|---|---|
| | Mg-Site | | | | | | Ge-Site | | | |
| | MgO | $M^2O_{1.5}$ | | $MgF_2$ | $M^6X_2$ | | | $GeO_2$ | $M^7O_{1.5}$ | | $Mn^{4+}$ |
| | x − b | $M^2$ | b | y | $M^6$ | X | f | 1 − g | $M^7$ | g | z |
| Comparative Example 1 | 3.5 | — | — | 0.5 | — | — | — | 1.0 | — | — | 0.015 |
| Example 1 | 3.095 | Sc | 0.005 | 0.65 | Ca | Cl | 0.25 | 1.0 | — | — | 0.015 |
| Example 2 | 3.05 | | 0.05 | | | | | | | | |
| Example 3 | 3.00 | | 0.10 | | | | | | | | |
| Example 4 | 2.80 | | 0.30 | | | | | | | | |
| Example 5 | 2.60 | | 0.50 | | | | | | | | |
| Example 6 | 3.10 | — | — | | | | | 0.995 | Ga | 0.005 | |
| Example 7 | | | | | | | | 0.95 | | 0.05 | |
| Example 8 | | | | | | | | 0.90 | | 0.10 | |
| Example 9 | | | | | | | | 0.70 | | 0.30 | |
| Comparative Example 2 | | | | | | | | 0.50 | | 0.50 | |
| Example 10 | 3.095 | Sc | 0.005 | | | | | 0.995 | | 0.005 | |
| Example 11 | 3.05 | | 0.05 | | | | | 0.95 | | 0.05 | |
| Example 12 | 3.00 | | 0.10 | | | | | 0.90 | | 0.10 | |
| Example 13 | 2.80 | | 0.30 | | | | | 0.70 | | 0.30 | |
| Comparative Example 3 | 2.60 | | 0.50 | | | | | 0.50 | | 0.50 | |

TABLE 3

| | Analytical Value Molar Ratio (mol) | | | | | | | | | | Powder Characteristics |
|---|---|---|---|---|---|---|---|---|---|---|---|
| | Mg-Site | | | | | | | Ge-Site | | | 440 nm Relative ENG |
| | MgO | $M^2O_{1.5}$ | | $MgF_2$ | $M^6X_2$ | | | $GeO_2$ | $M^7O_{1.5}$ | | $Mn^{4+}$ | |
| | x − b | $M^2$ | b | y | $M^6$ | X | f | 1 − g | $M^7$ | g | z | (%) |
| Comparative Example 1 | 3.473 | — | — | 0.286 | — | — | — | 1.000 | — | — | 0.015 | 100 |

TABLE 3-continued

| | Analytical Value Molar Ratio (mol) | | | | | | | | | | Powder Characteristics |
|---|---|---|---|---|---|---|---|---|---|---|---|
| | Mg-Site | | | | | | Ge-Site | | | | 440 nm Rela- |
| | MgO | $M^2O_{1.5}$ | | MgF$_2$ | $M^6X_2$ | | | GeO$_2$ | $M^7O_{1.5}$ | | Mn$^{4+}$ | tive ENG |
| | x − b | $M^2$ | b | y | $M^6$ | X | f | 1 − g | $M^7$ | g | z | (%) |
| Example 1 | 3.446 | Sc | 0.007 | 0.488 | Ca | Cl | 0.397 | 1.000 | — | — | 0.013 | 172 |
| Example 2 | 3.503 | | 0.049 | 0.488 | | | 0.367 | 1.000 | | | 0.013 | 190 |
| Example 3 | 3.410 | | 0.110 | 0.467 | | | 0.366 | 1.000 | | | 0.013 | 182 |
| Example 4 | 3.178 | | 0.320 | 0.496 | | | 0.380 | 1.000 | | | 0.013 | 154 |
| Example 5 | 2.906 | | 0.495 | 0.458 | | | 0.333 | 1.000 | | | 0.013 | 132 |
| Example 6 | 3.385 | — | — | 0.517 | | | 0.360 | 0.997 | Ga | 0.003 | 0.013 | 146 |
| Example 7 | 3.385 | | | 0.572 | | | 0.359 | 0.965 | | 0.035 | 0.014 | 141 |
| Example 8 | 3.413 | | | 0.569 | | | 0.363 | 0.915 | | 0.085 | 0.014 | 153 |
| Example 9 | 3.467 | | | 0.576 | | | 0.360 | 0.730 | | 0.270 | 0.013 | 129 |
| Comparative Example 2 | 3.477 | | | 0.518 | | | 0.356 | 0.516 | | 0.484 | 0.013 | 75 |
| Example 10 | 3.318 | Sc | 0.006 | 0.517 | | | 0.350 | 0.982 | | 0.018 | 0.013 | 168 |
| Example 11 | 3.497 | | 0.050 | 0.532 | | | 0.259 | 0.950 | | 0.050 | 0.015 | 201 |
| Example 12 | 3.328 | | 0.099 | 0.451 | | | 0.341 | 0.907 | | 0.093 | 0.013 | 213 |
| Example 13 | 3.088 | | 0.296 | 0.470 | | | 0.337 | 0.705 | | 0.295 | 0.013 | 148 |
| Comparative Example 3 | 2.954 | | 0.493 | 0.504 | | | 0.334 | 0.504 | | 0.496 | 0.013 | 53 |

The red phosphors of Examples 1-5 are Sc-substituted phosphors. Accordingly, a larger relative energy was exhibited in each red phosphor. Particularly, a very large relative energy was exhibited in each of the red phosphors of Examples 1 to 4, in which a substitution amount of Sc was in a range of 0.007 to 0.320 mol (b satisfies 0.007≤b≤0.320).

The red phosphors of Examples 6-9 are Ge-substituted phosphors. Accordingly, a larger relative energy was exhibited in each red phosphor. However, in the case of Ge-substitution, the red phosphor of Comparative Example 2 in which the substitution amount of Ga was 0.484 mol (g=0.484) resulted in a significantly small relative ENG.

The red phosphors of Examples 10-13 are Ga—Sc co-substituted phosphors. Particularly, a relative energy that exceeding 200% was exhibited in the red phosphors of Examples 11 and 12, in which in the Ga—Sc co-substitution, a substitution amount of Sc in a range of 0.050 to 0.099 mol (b satisfies 0.050≤b≤0.099), and a substitution amount of Ga in a range of 0.050 to 0.093 mol (g satisfies 0.050≤g≤0.093). However, in the case of Ga—Sc co-substitution, the red phosphor of Comparative Example 3 in which the substitution amount of Ga was 0.496 mol (g=0.496) exhibited a very small relative energy.

Figure 3:
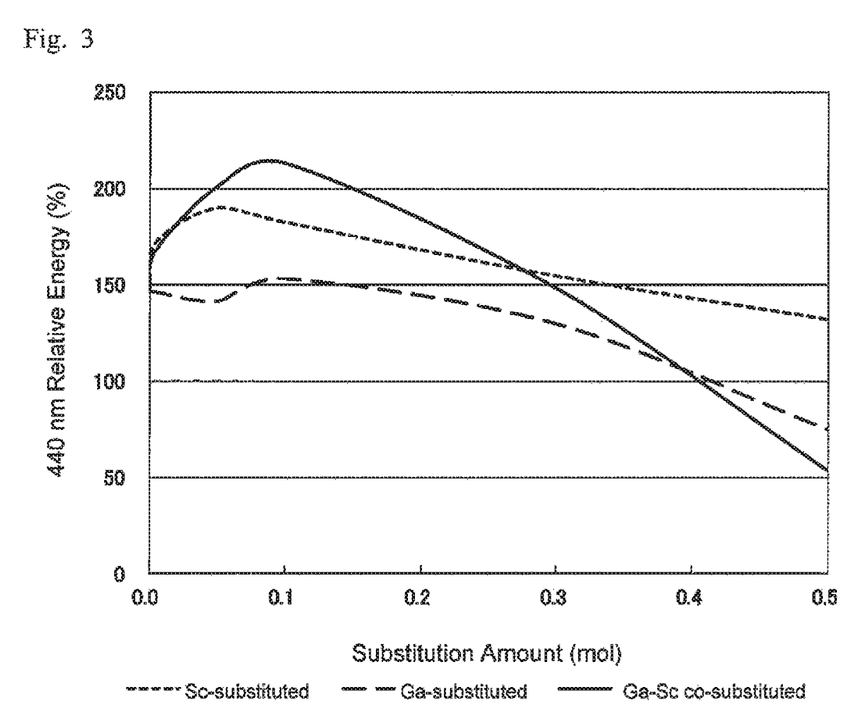
FIG. 3 is a diagram showing relative energies of phosphors according to one embodiment of the present disclosure.

FIG. 3 is a diagram showing relative energies excited at 440 nm of Sc-substituted phosphors of Examples 2 to 6, Ge-substituted phosphors of Examples 6 to 9 and Comparative Example 2, the Ga—Sc co-substituted phosphors of Examples 10 to 13 and Comparative Example 3, each corresponding to respective substituting amounts (mol).

As shown in FIG. 3, the phosphors of Examples 11 and 12 in which the substitution amount of Sc is in a range of 0.050 to 0.099 mol (b satisfies 0.050≤b≤0.099) and the substitution amount of Ga is in a range of 0.050 to 0.093 mol (g satisfies 0.050≤g≤0.093) exhibited larger relative energies compared to that of the phosphors of Examples 2 and 3 with an approximately same substitution amount of Sc and to that of the phosphors of Examples 7 and 8 with Ga. This is thought that simultaneously substituting elements of different valence numbers with a specific amount allows for further increase in the effect of charge compensation, which can further suppress concentration quenching. However, the phosphor of Comparative Example 3 has an excessive substitution amount of Ga, which resulting in a very small relative ENG.

Examples 14-20, Comparative Examples 4-6

For the raw materials, MgO, MgF$_2$, CaCl$_2$, GeO$_2$, MnCO$_3$ were exactly weighed. Then, for the raw materials of the elements for substituting MgO or GeO$_2$, Sc$_2$O$_3$ and Ga$_2$O$_3$ were exactly weighed. Then, the weighed raw materials were mixed by using a rotation blade type mixing machine. The mixed raw material was calcined in an air atmosphere at a temperature in a range of 1000 to 1300° C., for 4 to 12 hours. Thus, the red phosphors according to Examples 14 to 20 and Comparative Examples 4 to 6, whose composition formulas are shown in Table 4 were obtained. The luminance of phosphor powder and the composition of the red phosphors of Examples 14 to 20 and Comparative Examples 4 to 6 were measured in a similar manner as in Example 1. The charging ratios for the phosphors are shown in Table 5 below. The relative energies and the compositions of the phosphors are shown in Table 6 below.

TABLE 4

| | Substituting Element | Composition Formula |
|---|---|---|
| Comparative Example 4 | Sc, Ga, CaCl$_2$ | 1.05MgO•0.025Sc$_2$O$_3$•0.65MgF$_2$•0.25CaCl$_2$•0.95GeO$_2$•0.025Ga$_2$O$_3$:0.015Mn$^{4+}$ |
| Example 14 | Sc, Ga, CaCl$_2$ | 2.05MgO•0.025Sc$_2$O$_3$•0.65MgF$_2$•0.25CaCl$_2$•0.95GeO$_2$•0.025Ga$_2$O$_3$:0.015Mn$^{4+}$ |
| Example 15 | Sc, Ga, CaCl$_2$ | 5.05MgO•0.025Sc$_2$O$_3$•0.65MgF$_2$•0.25CaCl$_2$•0.95GeO$_2$•0.025Ga$_2$O$_3$:0.015Mn$^{4+}$ |
| Example 16 | Sc, Ga, CaCl$_2$ | 10.05MgO•0.025Sc$_2$O$_3$•0.65MgF$_2$•0.25CaCl$_2$•0.95GeO$_2$•0.025Ga$_2$O$_3$:0.015Mn$^{4+}$ |

TABLE 4-continued

| | Substituting Element | Composition Formula |
|---|---|---|
| Comparative Example 5 | Sc, Ga, CaCl$_2$ | 3.7MgO•0.025Sc$_2$O$_3$•0.25CaCl$_2$•0.95GeO$_2$•0.025Ga$_2$O$_3$:0.015Mn$^{4+}$ |
| Example 17 | Sc, Ga, CaCl$_2$ | 3.6MgO•0.025Sc$_2$O$_3$•0.1MgF$_2$•0.25CaCl$_2$•0.95GeO$_2$•0.025Ga$_2$O$_3$:0.015Mn$^{4+}$ |
| Example 18 | Sc, Ga, CaCl$_2$ | 3.45MgO•0.025Sc$_2$O$_3$•0.25MgF$_2$•0.25CaCl$_2$•0.95GeO$_2$•0.025Ga$_2$O$_3$:0.015Mn$^{4+}$ |
| Example 19 | Sc, Ga, CaCl$_2$ | 2.45MgO•0.025Sc$_2$O$_3$•1.25MgF$_5$•0.25CaCl$_2$•0.95GeO$_2$•0.025Ga$_2$O$_3$:0.015Mn$^{4+}$ |
| Example 20 | Sc, Ga, CaCl$_2$ | 2.2MgO•0.025Sc$_2$O$_3$•1.5MgF$_5$•0.25CaCl$_2$•0.95GeO$_2$•0.025Ga$_2$O$_3$:0.015Mn$^{4+}$ |
| Comparative Example 6 | Sc, Ga, CaCl$_2$ | 2.7MgO•0.025Sc$_2$O$_3$•2.0MgF$_2$•0.25CaCl$_2$•0.95GeO$_2$•0.025Ga$_2$O$_3$:0.015Mn$^{4+}$ |
| Comparative Example 1 | — | 3.5MgO•0.5MgF$_2$•GeO$_2$:0.015Mn$^{4+}$ |

TABLE 5

| | Charging Ratio Molar Ratio (mol) | | | | | | | | | |
|---|---|---|---|---|---|---|---|---|---|---|
| | Mg-Site | | | | | | Ge-Site | | | |
| | MgO | M$^2$O$_{1.5}$ | | MgF$_2$ | M$^6$X$_2$ | | | GeO$_2$ | M$^7$O$_{1.5}$ | | Mn$^{4+}$ |
| | x − b | M$^2$ | b | y | M$^6$ | X | f | 1 − g | M$^7$ | g | z |
| Comparative Example 1 | 3.5 | — | — | 0.5 | — | — | — | 1.0 | — | — | 0.015 |
| Comparative Example 4 | 1.05 | Sc | 0.05 | 0.65 | Ca | Cl | 0.25 | 0.95 | Ga | 0.05 | 0.015 |
| Example 14 | 2.05 | | | | | | | | | | |
| Example 15 | 5.05 | | | | | | | | | | |
| Example 16 | 10.05 | | | | | | | | | | |
| Comparative Example 5 | 3.7 | | | 0 | | | | | | | |
| Example 17 | 3.6 | | | 0.1 | | | | | | | |
| Example 18 | 3.45 | | | 0.25 | | | | | | | |
| Example 19 | 2.45 | | | 1.25 | | | | | | | |
| Example 20 | 2.2 | | | 1.5 | | | | | | | |
| Comparative Example 6 | 1.7 | | | 2.0 | | | | | | | |

TABLE 6

| | Analytical Value Molar Ratio (mol) | | | | | | | | | | | Powder Characteristics |
|---|---|---|---|---|---|---|---|---|---|---|---|---|
| | Mg-Site | | | | | | | Ge-Site | | | | 440 nm Relative ENG |
| | MgO | M$^2$O$_{1.5}$ | | MgF$_2$ | M$^6$X$_2$ | | | GeO$_2$ | M$^7$O$_{1.5}$ | | Mn$^{4+}$ | |
| | x − b | M$^2$ | b | y | M$^6$ | X | f | 1 − g | M$^7$ | g | z | (%) |
| Comparative Example 1 | 3.473 | — | — | 0.286 | — | — | — | 1.000 | — | — | 0.015 | 100 |
| Comparative Example 4 | 1.144 | Sc | 0.049 | 0.674 | Ca | Cl | 0.255 | 0.976 | Ga | 0.024 | 0.009 | 43 |
| Example 14 | 2.422 | | 0.051 | 0.403 | | | 0.335 | 0.953 | | 0.047 | 0.014 | 177 |
| Example 15 | 5.189 | | 0.049 | 0.470 | | | 0.348 | 0.953 | | 0.047 | 0.015 | 177 |
| Example 16 | 10.039 | | 0.048 | 0.530 | | | 0.164 | 0.957 | | 0.043 | 0.012 | 132 |
| Comparative Example 5 | 3.963 | | 0.049 | 0.000 | | | 0.371 | 0.953 | | 0.047 | 0.012 | 2 |
| Example 17 | 4.069 | | 0.054 | 0.160 | | | 0.327 | 0.950 | | 0.050 | 0.015 | 127 |
| Example 18 | 3.672 | | 0.050 | 0.241 | | | 0.369 | 0.951 | | 0.049 | 0.015 | 151 |
| Example 19 | 2.925 | | 0.049 | 0.856 | | | 0.305 | 0.953 | | 0.047 | 0.015 | 205 |
| Example 20 | 2.469 | | 0.048 | 1.213 | | | 0.288 | 0.959 | | 0.041 | 0.014 | 164 |
| Comparative Example 6 | 2.107 | | 0.049 | 1.597 | | | 0.222 | 0.959 | | 0.041 | 0.011 | 86 |

The red phosphors of Examples 14 to 16 have different content of MgO but otherwise approximately same composition ratio. Even a large amount of MgO is contained in the red phosphors, the relative ENG changes little, but the phosphors of Examples 14 and 15 with a content of MgO in a range of 2.422 to 5.189 mol (x-b satisfies 2.422≤(x-b)≤ 5.189) exhibited larger relative ENG. However, the phosphor of Comparative Example 4 having a MgO content of 1.144 mol ((x-b)=1.144) exhibited a significantly small relative ENG. The red phosphors of Examples 17 to 20 and Comparative Examples 5 and 6 have different content of MgO and MgF$_2$ but otherwise approximately same composition ratio. The red phosphor of Comparative Example 5 does not contain $MgF_2$ (y=0), so that exhibited very small relative ENG. In the phosphors of Examples 17 to 20, the larger content of $MgF_2$, the larger the relative ENG. However, the phosphor of Comparative Example 6 in which the content of $MgF_2$ was 1.597 mol (y=1.597) exhibited a very small relative ENG.

Examples 21-26, Comparative Example 7

For the raw materials, MgO, $MgF_2$, $CaCl_2$, $GeO_2$, $MnCO_3$ were exactly weighed. Then, for the raw materials of the elements for substituting MgO or $GeO_2$, $CaCO_3$, $SrCO_3$, $BaCO_3$, ZnO, $Sc_2O_3$ and $Ga_2O_3$ were exactly weighed. Then, the weighed raw materials were mixed by using a rotation blade type mixing machine. The mixed raw material was calcined in an air atmosphere at a temperature in a range of 1000 to 1300° C., for 4 to 12 hours. Thus, the red phosphors according to Examples 21 to 26 and Comparative Example 7, whose composition formulas are shown in Table 7 were obtained. The luminance of phosphor powder and the composition of the red phosphors of Examples 21 to 26 and Comparative Example 7 were measured in a similar manner as in Example 1. The charging ratios for the phosphors are shown in Table 8 below. The relative energies and the compositions of the phosphors are shown in Table 9 below.

TABLE 7

| | Substituting Element | Composition Formula |
|---|---|---|
| Example 21 | CaO, Sc, Ga, $CaCl_2$ | $2.95MgO•0.1CaO•0.025Sc_2O_3•0.65MgF_2•0.25CaCl_2•0.95GeO_2•0.025Ga_2O_3:0.015Mn^{4+}$ |
| Example 22 | CaO, Sc, Ga, $CaCl_2$ | $2.85MgO•0.2CaO•0.025Sc_2O_3•0.65MgF_3•0.25CaCl_2•0.95GeO_2•0.025Ga_2O_3:0.015Mn^{4+}$ |
| Example 23 | CaO, Sc, Ga, $CaCl_2$ | $2.55MgO•0.5CaO•0.025Sc_2O_3•0.65MgF_2•0.25CaCl_2•0.95GeO_2•0.025Ga_2O_3:0.015Mn^{4+}$ |
| Comparative Example 7 | CaO, Sc, Ga, $CaCl_2$ | $2.05MgO•0.1CaO•0.025Sc_2O_3•0.65MgF_3•0.25CaCl_2•0.95GeO_2•0.025Ga_2O_3:0.015Mn^{4+}$ |
| Example 24 | SrO, Sc, Ga, $CaCl_2$ | $2.75MgO•0.3SrO•0.025Sc_2O_3•0.65MgF_2•0.25CaCl_2•0.95GeO_2•0.025Ga_2O_3:0.015Mn^{4+}$ |
| Example 25 | BaO, Sc, Ga, $CaCl_2$ | $2.75MgO•0.3BaO•0.025Sc_2O_3•0.65MgF_2•0.25CaCl_2•0.95GeO_2•0.025Ga_2O_3:0.015Mn^{4+}$ |
| Example 26 | ZnO, Sc, Ga, $CaCl_2$ | $2.75MgO•0.3ZnO•0.025Sc_2O_3•0.65MgF_2•0.25CaCl_2•0.95GeO_2•0.025Ga_2O_3:0.015Mn^{4+}$ |
| Comparative Example 1 | — | $3.5MgO•0.5MgF_2•GeO_2:0.015Mn^{4+}$ |

TABLE 8

| | Charging Ratio Molar Ratio (mol) | | | | | | | | | | | |
|---|---|---|---|---|---|---|---|---|---|---|---|---|
| | Mg-Site | | | | | | | | Ge-Site | | | |
| | MgO | $M^1O$ | | $M^2O_{1.5}$ | | $MgF_2$ | $M^6X_2$ | | $GeO_2$ | $M^7O_{1.5}$ | | $Mn^{4+}$ |
| | x − a − b | $M^1$ | a | $M^2$ | b | y | $M^6$ | X | f | 1 − g | $M^7$ | g | z |
| Comparative Example 1 | 3.5 | — | — | — | — | 0.5 | — | — | — | 1.0 | — | — | 0.015 |
| Example 21 | 2.95 | Ca | 0.1 | Sc | 0.05 | 0.65 | Ca | Cl | 0.25 | 0.95 | Ga | 0.05 | 0.015 |
| Example 22 | 2.85 | | 0.2 | | | | | | | | | | |
| Example 23 | 2.55 | | 0.5 | | | | | | | | | | |
| Comparative Example 7 | 2.05 | | 1.0 | | | | | | | | | | |
| Example 24 | 2.75 | Sr | 0.3 | | | | | | | | | | |
| Example 25 | | Ba | | | | | | | | | | | |
| Example 26 | | Zn | | | | | | | | | | | |

TABLE 9

| | Analytical Value Molar Ratio (mol) | | | | | | | | | | | | Powder Characteristics |
|---|---|---|---|---|---|---|---|---|---|---|---|---|---|
| | Mg-Site | | | | | | | | Ge-Site | | | | 440 nm Relative ENG |
| | MgO | $M^1O$ | | $M^2O_{1.5}$ | | $MgF_2$ | $M^6X_2$ | | $GeO_2$ | $M^7O_{1.5}$ | | $Mn^{4+}$ | |
| | x − a − b | $M^1$ | a | $M^2$ | b | y | $M^6$ | X | f | 1 − g | $M^7$ | g | z | (%) |
| Comparative Example 1 | 3.473 | Ca | — | — | — | 0.286 | — | — | — | 1.000 | — | — | 0.015 | 100 |
| Example 21 | 3.289 | | 0.382 | Sc | 0.048 | 0.556 | Ca | Cl | 0.002 | 0.952 | Ga | 0.048 | 0.014 | 183 |
| Example 22 | 3.235 | | 0.462 | | 0.051 | 0.558 | | | 0.009 | 0.951 | | 0.049 | 0.014 | 208 |
| Example 23 | 3.069 | | 0.419 | | 0.049 | 0.431 | | | 0.038 | 0.951 | | 0.049 | 0.015 | 173 |
| Comparative Example 7 | 2.423 | | 1.083 | | 0.050 | 0.627 | | | 0.091 | 0.951 | | 0.049 | 0.015 | 65 |
| Example 24 | 3.163 | Sr | 0.248 | | 0.051 | 0.463 | | | 0.248 | 0.951 | | 0.049 | 0.015 | 204 |
| Example 25 | 3.209 | Ba | 0.254 | | 0.050 | 0.468 | | | 0.283 | 0.950 | | 0.050 | 0.014 | 162 |
| Example 26 | 3.002 | Ba | 0.094 | | 0.051 | 0.444 | | | 0.194 | 0.950 | | 0.050 | 0.014 | 213 |

The red phosphors of Examples 21-23, and Comparative Example 7 each has a composition of the first red phosphor in which the contents of CaO that substitutes a portion of MgO are different. The red phosphor of Comparative Example 7 in which the content of CaO was 1.083 mol (a=1.083) exhibited a very small relative energy.

Further, as shown in Examples 24-26, the red phosphors in which CaO for substituting a portion of MgO was replaced by SrO, BaO, or ZnO exhibited similar relative energies as of the red phosphors of Examples 21-23.

Examples 27-36

For the raw materials, MgO, MgF$_2$, CaCl$_2$, GeO$_2$, MnCO$_3$ were exactly weighed. Then, for the raw materials of the elements for substituting MgO, GeO$_2$, or MgF$_2$, Sc$_2$O$_3$, Ga$_2$O$_3$, CaF$_2$, MgCl$_2$.6H$_2$O, SrCl$_2$, BaCl$_2$, ZnCl$_2$, MgBr$_2$.6H$_2$O, and CaBr$_2$ were exactly weighed. Then, the weighed raw materials were mixed by using a rotation blade type mixing machine. The raw material mixture was calcined in an air atmosphere at a temperature in a range of 1000 to 1300° C. for 4 to 12 hours. Thus, the red phosphors of Examples 27-36 whose composition formulas are shown in Table 10 were obtained. The luminance of phosphor powder and the composition of the red phosphors of Examples 27-36 were measured in a similar manner as in Example 1. The charging ratios for the phosphors are shown in Table 11 below. The relative energies and the compositions of the phosphors are shown in Table 12 below.

TABLE 10

| | Substituting Element | Composition Formula |
|---|---|---|
| Example 27 | Sc, Ga, CaCl$_2$ | 3.05MgO•0.025Sc$_2$O$_3$•0.7MgF$_2$•0.2CaCl$_2$•0.95GeO$_2$•0.025Ga$_2$O$_3$:0.015Mn$^{4+}$ |
| Example 28 | Sc, Ga, CaCl$_2$ | 3.05MgO•0.025Sc$_2$O$_3$•0.65MgF$_2$•0.5CaCl$_2$•0.95GeO$_2$•0.025Ga$_2$O$_3$:0.015Mn$^{4+}$ |
| Example 29 | Sc, Ga, CaCl$_2$ | 3.05MgO•0.025Sc$_2$O$_3$•0.65MgF$_2$•1.0CaCl$_2$•0.95GeO$_2$•0.025Ga$_2$O$_3$:0.015Mn$^{4+}$ |
| Example 30 | Sc, Ga, CaCl$_2$ | 3.05MgO•0.025Sc$_2$O$_3$•0.65MgF$_2$•1.5CaCl$_2$•0.95GeO$_2$•0.025Ga$_2$O$_3$:0.015Mn$^{4+}$ |
| Example 31 | Sc, Ga, MgCl$_2$ | 3.05MgO•0.025Sc$_2$O$_3$•0.7MgF$_2$•0.2MgCl$_2$•0.95GeO$_2$•0.025Ga$_2$O$_3$:0.015Mn$^{4+}$ |
| Example 32 | Sc, Ga, SrCl$_2$ | 3.05MgO•0.025Sc$_2$O$_3$•0.7MgF$_2$•0.2SrCl$_2$•0.95GeO$_2$•0.025Ga$_2$O$_3$:0.015Mn$^{4+}$ |
| Example 33 | Sc, Ga, BaCl$_2$ | 3.05MgO•0.025Sc$_2$O$_3$•0.7MgF$_2$•0.2BaCl$_2$•0.95GeO$_2$•0.025Ga$_2$O$_3$:0.015Mn$^{4+}$ |
| Example 34 | Sc, Ga, ZnCl$_2$ | 3.05MgO•0.025Sc$_2$O$_3$•0.7MgF$_2$•0.2ZnCl$_2$•0.95GeO$_2$•0.025Ga$_2$O$_3$:0.015Mn$^{4+}$ |
| Example 35 | Sc, Ga, MgBr$_2$ | 3.05MgO•0.025Sc$_2$O$_3$•0.7MgF$_2$•0.2MgBr$_2$•0.95GeO$_2$•0.025Ga$_2$O$_3$:0.015Mn$^{4+}$ |
| Example 36 | Sc, Ga, CaBr$_2$ | 3.05MgO•0.025Sc$_2$O$_3$•0.7MgF$_2$•0.2CaBr$_2$•0.95GeO$_2$•0.025Ga$_2$O$_3$:0.015Mn$^{4+}$ |
| Comparative Example 1 | — | 3.5MgO•0.5MgF$_2$•GeO$_2$•:0.015Mn$^{4+}$ |

TABLE 11

| | Charging Ratio Molar Ratio (mol) | | | | | | | | | |
|---|---|---|---|---|---|---|---|---|---|---|
| | Mg-Site | | | | | Ge-Site | | | |
| | MgO | M$^2$O$_{1.5}$ | | MgF$_2$ | M$^6$X$_2$ | | GeO$_2$ | M$^7$O$_{1.5}$ | | Mn$^{4+}$ |
| | x − b | M$^2$ | b | y | M$^6$ | X | f | 1 − g | M$^7$ | g | z |
| Comparative Example 1 | 3.5 | — | — | 0.5 | — | — | — | 1.0 | — | — | 0.015 |
| Example 27 | 3.05 | Sc | 0.05 | 0.7 | Ca | Cl | 0.2 | 0.95 | Ga | 0.05 | 0.015 |
| Example 28 | | | | 0.65 | | | 0.5 | | | | |
| Example 29 | | | | | | | 1.0 | | | | |
| Example 30 | | | | | | | 1.5 | | | | |
| Example 31 | | | | 0.7 | Mg | Cl | 0.2 | | | | |
| Example 32 | | | | | Sr | | | | | | |
| Example 33 | | | | | Ba | | | | | | |
| Example 34 | | | | | Zn | | | | | | |
| Example 35 | | | | | Mg | Br | | | | | |
| Example 36 | | | | | Ca | | | | | | |

TABLE 12

| | Analytical Value Molar Ratio (mol) | | | | | | | | | | Powder Characteristics |
|---|---|---|---|---|---|---|---|---|---|---|---|
| | Mg-Site | | | | | | Ge-Site | | | | 440 nm Relative ENG |
| | MgO | M$^2$O$_{1.5}$ | | MgF$_2$ | M$^6$X$_2$ | | | GeO$_2$ | M$^7$O$_{1.5}$ | | Mn$^{4+}$ | |
| | x − b | M$^2$ | b | y | M$^6$ | X | f | 1 − g | M$^7$ | g | z | (%) |
| Comparative Example 1 | 3.473 | — | — | 0.286 | — | — | — | 1.000 | — | — | 0.015 | 100 |
| Example 27 | 3.312 | Sc | 0.051 | 0.660 | Ca | Cl | 0.296 | 0.953 | Ga | 0.047 | 0.015 | 190 |
| Example 28 | 3.293 | | 0.050 | 0.564 | | | 0.463 | 0.953 | | 0.047 | 0.014 | 204 |
| Example 29 | 3.468 | | 0.050 | 0.469 | | | 0.852 | 0.955 | | 0.045 | 0.013 | 202 |

TABLE 12-continued

| | Analytical Value Molar Ratio (mol) | | | | | | | | | Powder Characteristics |
|---|---|---|---|---|---|---|---|---|---|---|
| | Mg-Site | | | | | Ge-Site | | | | 440 nm Relative ENG |
| | MgO | $M^2O_{1.5}$ | MgF$_2$ | $M^6X_2$ | | | GeO$_2$ | $M^7O_{1.5}$ | Mn$^{4+}$ | |
| | x − b | $M^2$ b | y | $M^6$ | X | f | 1 − g | $M^7$ g | z | (%) |
| Example 30 | 3.271 | 0.050 | 0.630 | | | 1.472 | 0.957 | 0.043 | 0.013 | 144 |
| Example 31 | 3.747 | 0.050 | 0.456 | Mg | Cl | 0.002 | 0.949 | 0.051 | 0.014 | 137 |
| Example 32 | 3.397 | 0.049 | 0.563 | Sr | | 0.185 | 0.952 | 0.048 | 0.014 | 194 |
| Example 33 | 3.457 | 0.049 | 0.488 | Ba | | 0.210 | 0.951 | 0.049 | 0.014 | 161 |
| Example 34 | 3.816 | 0.053 | 0.343 | Zn | | 0.054 | 0.947 | 0.053 | 0.012 | 172 |
| Example 35 | 3.961 | 0.054 | 0.360 | Mg | Br | 0.0002 | 0.947 | 0.053 | 0.013 | 152 |
| Example 36 | 3.589 | 0.052 | 0.477 | Ca | | 0.185 | 0.949 | 0.051 | 0.012 | 188 |

As shown in Table 12, the red phosphors of Examples 27 to 30 each has a composition of the Ga—Sc co-substituted second red phosphor in which the ratios of MgF$_2$ and CaCl$_2$ are changed but the composition ratios of others are approximately fixed. The red phosphors of Examples 28 and 29 each contains specific amounts of MgF$_2$ and CaCl$_2$ exhibit the relative energies exceeding 200%. Further, as shown in Examples 31 to 36, the red phosphors in which CaCl$_2$ that substitutes a portion of MgF$_2$ is changed to MgCl$_2$, SrCl$_2$, BaCl$_2$, ZnCl$_2$, MgBr$_2$, or CaBr$_2$ exhibit the relative energies similar to the relative energy of the red phosphor of Example 27.

Examples 37-40, Comparative Example 8

For the raw materials, MgO, MgF$_2$, CaCl$_2$, GeO$_2$, MnCO$_3$ were exactly weighed. Then, for the raw materials of the elements for substituting MgO or GeO$_2$, Sc$_2$O$_3$ and Ga$_2$O$_3$ were exactly weighed. Then, the weighed raw materials were mixed by using a rotation blade type mixing machine. The mixture of the raw materials was calcined in an air atmosphere at a temperature in a range of 1000 to 1300° C. for 4 to 12 hours. Thus, the red phosphors of Examples 37 to 40 and Comparative Example 8, whose composition formulas are shown in Table 13 were obtained. The luminance of phosphor powder and the composition of the red phosphors of Examples 37 to 40 and Comparative Example 8 were measured in a similar manner as in Example 1. The charging ratios for the phosphors are shown in Table 14 below. The relative energies and the compositions of the phosphors are shown in Table 15 below.

TABLE 13

| | Substituting Element | Composition Formula |
|---|---|---|
| Example 37 | Sc, Ga, CaCl$_2$ | 3.05MgO•0.025Sc$_2$O$_3$•0.65MgF$_2$•0.25CaCl$_2$•0.95GeO$_2$•0.025Ga$_2$O$_3$:0.001Mn$^{4+}$ |
| Example 38 | Sc, Ga, CaCl$_2$ | 3.05MgO•0.025Sc$_2$O$_3$•0.65MgF$_2$•0.25CaCl$_2$•0.95GeO$_2$•0.025Ga$_2$O$_3$:0.01Mn$^{4+}$ |
| Example 39 | Sc, Ga, CaCl$_2$ | 3.05MgO•0.025Sc$_2$O$_3$•0.65MgF$_2$•0.25CaCl$_2$•0.95GeO$_2$•0.025Ga$_2$O$_3$:0.03Mn$^{4+}$ |
| Example 40 | Sc, Ga, CaCl$_2$ | 3.05MgO•0.025Sc$_2$O$_3$•0.65MgF$_2$•0.25CaCl$_2$•0.95GeO$_2$•0.025Ga$_2$O$_3$:0.05Mn$^{4+}$ |
| Comparative Example 8 | Sc, Ga, CaCl$_2$ | 3.05MgO•0.025Sc$_2$O$_3$•0.65MgF$_3$•0.25CaCl$_2$•0.95GeO$_2$•0.025Ga$_2$O$_3$:0.1Mn$^{4+}$ |
| Comparative Example 1 | — | 3.5MgO•0.5MgF$_2$•GeO$_2$:0.015Mn$^{4+}$ |

TABLE 14

| | Charging Ratio Molar Ratio (mol) | | | | | | | | |
|---|---|---|---|---|---|---|---|---|---|
| | Mg-Site | | | | | | Ge-Site | | |
| | MgO | $M^2O_{1.5}$ | MgF$_2$ | $M^6X_2$ | | | GeO$_2$ | $M^7O_{1.5}$ | Mn$^{4+}$ |
| | x − b | $M^2$ b | y | $M^6$ | X | f | 1 − g | $M^7$ g | z |
| Comparative Example 1 | 3.5 | — — | 0.5 | — | — | — | 1.0 | — — | 0.015 |
| Example 37 | 3.05 | Sc 0.05 | 0.65 | Ca | Cl | 0.25 | 0.95 | Ga 0.05 | 0.001 |
| Example 38 | | | | | | | | | 0.01 |
| Example 39 | | | | | | | | | 0.03 |
| Example 40 | | | | | | | | | 0.05 |
| Comparative Example 8 | | | | | | | | | 0.1 |

TABLE 15

| | Analytical Value Molar Ratio (mol) | | | | | | | | | Powder Characteristics |
|---|---|---|---|---|---|---|---|---|---|---|
| | Mg-Site | | | | | | Ge-Site | | | 440 nm Relative ENG |
| | MgO | $M^2O_{1.5}$ | MgF$_2$ | $M^6X_2$ | | | GeO$_2$ | $M^7O_{1.5}$ | Mn$^{4+}$ | |
| | x − b | M$^2$ | b | y | M$^6$ | X | f | 1 − g | M$^7$ | g | z | (%) |
| Comparative Example 1 | 3.473 | — | — | 0.286 | — | — | — | 1.000 | — | — | 0.015 | 100 |
| Example 37 | 3.363 | Sc | 0.050 | 0.644 | Ca | Cl | 0.290 | 0.953 | Ga | 0.047 | 0.001 | 132 |
| Example 38 | 3.348 | | 0.049 | 0.500 | | | 0.338 | 0.954 | | 0.046 | 0.008 | 178 |
| Example 39 | 3.376 | | 0.050 | 0.568 | | | 0.360 | 0.954 | | 0.046 | 0.026 | 197 |
| Example 40 | 3.497 | | 0.052 | 0.557 | | | 0.372 | 0.951 | | 0.049 | 0.049 | 120 |
| Comparative Example 8 | 3.619 | | 0.061 | 0.681 | | | 0.358 | 0.945 | | 0.055 | 0.101 | 15 |

The red phosphors of Examples 37 to 40 and Comparative Example 8 each has a composition of the Ga—Sc co-substituted second red phosphor in which the content of Mn$^{4+}$ is different but the composition ratios of others are approximately fixed. As shown in Table 15, the larger the content of Mn$^{4+}$ in the red phosphor, the larger the relative energy. Particularly, the red phosphors of Example 38 and 39 that have the Mn$^{4+}$ contents of 0.008 to 0.026 mol (z satisfies 0.008≤z≤0.026) exhibited further higher relative energies. However, the red phosphor of Comparative Example 8 that has the Mn$^{4+}$ content of 0.101 mol (z=0.101) exhibited a very small relative energy by the influence regarded as the concentration quenching.

Examples 41 to 48

For the raw materials, MgO, MgF$_2$, CaCl$_2$, GeO$_2$, MnCO$_3$ were exactly weighed. Then, for the raw material of the elements to substitute MgO, Sc$_2$O$_3$, K$_2$CO$_3$, Lu$_2$O$_3$, Ta$_2$O$_5$, or MoO$_3$ was exactly weighed, and for the raw material of the elements to substitute GeO$_2$, Ga$_2$O$_3$, H$_3$BO$_3$, In$_2$O$_3$, TiO$_2$, SnO$_2$ or Al$_2$O$_3$ was exactly weighed Then, the weighed raw materials were mixed by using a rotation blade type mixing machine. The mixture of the raw materials was calcined in an air atmosphere at a temperature in a range of 1000 to 1300° C. for 4 to 12 hours. Thus, the red phosphors of Examples 41 to 48 were obtained. The luminance of phosphor powder and the composition of the red phosphors of Examples 41 to 48 were measured in a similar manner as in Example 1. The charging ratios for the phosphors are shown in Tables 17, 19, 21, and 23 below. The relative energies and the compositions of the phosphors are shown in Tables 18, 20, 22, and 24 below.

TABLE 16

| | Substituting Element | Composition Formula |
|---|---|---|
| Example 41 | B, CaCl$_2$ | 3.1MgO•0.65MgF$_2$•0.25CaCl$_2$•0.95GeO$_2$•0.025Ba$_2$O$_3$:0.015Mn$^{4+}$ |
| Example 42 | In, CaCl$_2$ | 3.1MgO•0.65MgF$_2$•0.25CaCl$_2$•0.95GeO$_2$•0.025IN$_2$O$_3$:0.015Mn$^{4+}$ |
| Example 43 | Sc, B, CaCl$_2$ | 3.05MgO•0.025Sc$_2$O$_3$•0.65MgF$_2$•0.25CaCl$_2$•0.95GeO$_2$•0.025Ba$_2$O$_3$:0.015Mn$^{4+}$ |
| Example 44 | Sc, Al, CaCl$_2$ | 3.05MgO•0.025Sc$_2$O$_3$•0.65MgF$_2$•0.25CaCl$_2$•0.95GeO$_2$•0.025Al$_2$O$_3$:0.015Mn$^{4+}$ |
| Example 45 | Lu, B, CaCl$_2$ | 3.05MgO•0.025Lu$_2$O$_3$•0.65MgF$_2$•0.25CaCl$_2$•0.95GeO$_2$•0.025Ba$_2$O$_3$:0.015Mn$^{4+}$ |
| Example 46 | K, B, CaCl$_2$ | 3.05MgO•0.025K$_2$O$_3$•0.65MgF$_3$•0.25CaCl$_2$•0.95GeO$_2$•0.025B$_2$O$_3$:0.015Mn$^{4+}$ |
| Example 47 | Ta CaCl$_2$ | 3.05MgO•0.025Ta$_2$O$_3$•0.65MgF$_2$•0.25CaCl$_2$•GeO$_2$:0.015Mn$^{4+}$ |
| Example 48 | Mo, Ga, CaCl$_2$ | 3.05MgO•0.05MoO$_3$•0.65MgF$_2$•0.25CaCl$_2$•0.95GeO$_2$•0.025Ga$_2$O$_3$:0.015Mn$^{4+}$ |
| Comparative Example 1 | — | 3.5MgO•0.5MgF$_2$•GeO$_2$:0.015Mn$^{4+}$ |

TABLE 17

| | Charging Ratio Molar Ratio (mol) | | | | | | | | | |
|---|---|---|---|---|---|---|---|---|---|---|
| | Mg-Site | | | | | | Ge-Site | | | |
| | MgO | $M^2O_{1.5}$ | MgF$_2$ | $M^6X_2$ | | | GeO$_2$ | $M^7O_{1.5}$ | Mn$^{4+}$ |
| | x − b | M$^2$ | b | y | M$^6$ | X | f | 1 − g | M$^7$ | g | z |
| Comparative Example 1 | 3.5 | — | — | 0.5 | — | — | — | 1.0 | — | — | 0.015 |
| Example 41 | 3.1 | — | — | 0.65 | Ca | Cl | 0.25 | 0.95 | B | 0.05 | 0.015 |
| Example 42 | | | | | | | | | In | | |
| Example 43 | 3.05 | Sc | 0.05 | | | | | | B | | |
| Example 44 | | | | | | | | | Al | | |
| Example 45 | | Lu | | | | | | | B | | |

TABLE 18

| | Analytical Value Molar Ratio (mol) | | | | | | | | | | Powder Characteristics |
|---|---|---|---|---|---|---|---|---|---|---|---|
| | Mg-Site | | | | | | Ge-Site | | | | 440 nm Rela- |
| | MgO | $M^2O_{1.5}$ | | $MgF_2$ | $M^6X_2$ | | | $GeO_2$ | $M^7O_{1.5}$ | | $Mn^{4+}$ | tive ENG |
| | x − b | $M^2$ | b | y | $M^6$ | X | f | 1 − g | $M^7$ | g | z | (%) |
| Comparative Example 1 | 3.473 | — | — | 0.286 | — | — | — | 1.000 | — | — | 0.015 | 100 |
| Example 41 | 3.338 | — | — | 0.525 | Ca | Cl | 0.349 | 0.944 | B | 0.056 | 0.014 | 147 |
| Example 42 | 3.609 | | | 0.533 | | | | 0.369 | 0.999 | In | 0.001 | 0.016 | 155 |
| Example 43 | 3.334 | Sc | 0.048 | 0.499 | | | | 0.324 | 0.949 | B | 0.051 | 0.015 | 193 |
| Example 44 | 3.336 | | 0.049 | 0.502 | | | | 0.350 | 0.954 | Al | 0.046 | 0.012 | 193 |
| Example 45 | 3.335 | Lu | 0.050 | 0.471 | | | | 0.357 | 0.948 | B | 0.052 | 0.013 | 149 |

TABLE 19

| | Charging Ratio Molar Ratio (mol) | | | | | | | | | | |
|---|---|---|---|---|---|---|---|---|---|---|---|
| | Mg-Site | | | | | | | Ge-Site | | | |
| | MgO | $M^3O_{1.5}$ | | $MgF_2$ | $M^6X_2$ | | | $GeO_2$ | $M^7O_{1.5}$ | | $Mn^{4+}$ |
| | x − c | $M^3$ | c | y | $M^6$ | X | f | 1 − g | $M^7$ | g | z |
| Comparative Example 1 | 3.5 | — | — | 0.5 | — | — | — | 1.0 | — | — | 0.015 |
| Example 46 | 3.05 | K | 0.05 | 0.65 | Ca | Cl | 0.25 | 0.95 | B | 0.05 | 0.015 |

TABLE 20

| | Analytical Value Molar Ratio (mol) | | | | | | | | | | | Powder Characteristics |
|---|---|---|---|---|---|---|---|---|---|---|---|---|
| | Mg-Site | | | | | | | Ge-Site | | | | 440 nm Rela- |
| | MgO | $M^3O_{0.5}$ | | $MgF_2$ | $M^6X_2$ | | | $GeO_2$ | $M^7O_{1.5}$ | | $Mn^{4+}$ | tive ENG |
| | x − c | $M^3$ | c | y | $M^6$ | X | f | 1 − g | $M^7$ | g | z | (%) |
| Comparative Example 1 | 3.473 | — | — | 0.286 | — | — | — | 1.000 | — | — | 0.015 | 100 |
| Example 46 | 3.308 | K | 0.001 | 0.521 | Ca | Cl | 0.373 | 0.954 | B | 0.046 | 0.011 | 154 |

TABLE 21

| | Charging Ratio Molar Ratio (mol) | | | | | | | | | | |
|---|---|---|---|---|---|---|---|---|---|---|---|
| | Mg-Site | | | | | | | Ge-Site | | | |
| | MgO | $M^4O_{2.5}$ | | $MgF_2$ | $M^6X_2$ | | | $GeO_2$ | $M^7O_{1.5}$ | | $Mn^{4+}$ |
| | x − d | $M^4$ | d | y | $M^6$ | X | f | 1 − g | $M^7$ | g | z |
| Comparative Example 1 | 3.5 | — | — | 0.5 | — | — | — | 1.0 | — | — | 0.015 |
| Example 47 | 3.05 | Ta | 0.05 | 0.65 | Ca | Cl | 0.25 | 1.0 | — | — | 0.015 |

TABLE 22

| | Analytical Value Molar Ratio (mol) | | | | | | | | | Powder Characteristics |
|---|---|---|---|---|---|---|---|---|---|---|
| | Mg-Site | | | | | Ge-Site | | | | 440 nm Relative ENG (%) |
| | MgO | $M^4O_{2.5}$ | $MgF_2$ | $M^6X_2$ | | $GeO_2$ | $M^7O_{1.5}$ | | $Mn^{4+}$ | |
| | x − d | $M^4$ d | y | $M^6$ X | f | 1 − g | $M^7$ | g | z | |
| Comparative Example 1 | 3.473 | — — | 0.286 | — — | — | 1.000 | — | — | 0.015 | 100 |
| Example 47 | 3.336 | Ta 0.046 | 0.456 | Ca Cl | 0.359 | 1.000 | — | — | 0.011 | 157 |

TABLE 23

| | Charging Ratio Molar Ratio (mol) | | | | | | | | | |
|---|---|---|---|---|---|---|---|---|---|---|
| | Mg-Site | | | | | Ge-Site | | | | |
| | MgO | $M^5O_3$ | $MgF_2$ | $M^6X_2$ | | $GeO_2$ | $M^7O_{1.5}$ | | $Mn^{4+}$ | |
| | x − e | $M^5$ e | y | $M^6$ X | f | 1 − g | $M^7$ | g | z | |
| Comparative Example 1 | 3.5 | — — | 0.5 | — — | — | 1.0 | — | — | 0.015 | |
| Example 48 | 3.05 | Mo 0.05 | 0.65 | Ca Cl | 0.25 | 0.95 | Ga | 0.05 | 0.015 | |

TABLE 24

| | Analytical Value Molar Ratio (mol) | | | | | | | | | Powder Characteristics |
|---|---|---|---|---|---|---|---|---|---|---|
| | Mg-Site | | | | | Ge-Site | | | | 440 nm Relative ENG (%) |
| | MgO | $M^5O_3$ | $MgF_2$ | $M^6X_2$ | | $GeO_2$ | $M^7O_{1.5}$ | | $Mn^{4+}$ | |
| | x − e | $M^5$ e | y | $M^6$ X | f | 1 − g | $M^7$ | g | z | |
| Comparative Example 1 | 3.473 | — — | 0.286 | — — | — | 1.000 | — | — | 0.015 | 100 |
| Example 48 | 3.237 | Mo 0.053 | 0.544 | Ca Cl | 0.358 | 0.957 | Ga | 0.043 | 0.011 | 148 |

As shown in Examples 41 to 45 in Table 18, the red phosphors that have compositions of the second red phosphor in which a portion of $MgF_2$ is substituted by $CaCl_2$ and a portion of Mg of MgO is substituted by Lu; and a portion of Ge of $GeO_2$ is substituted by B, In, or Al, respectively exhibited relative energies similar to that of the second red phosphors of Examples 2, 7, and 11 in which a portion of $MgF_2$ is substituted by $CaCl_2$, and a portion of Mg of MgO is substituted by Sc, and/or a portion of Ge of $GeO_2$ is substituted by Ga.

As shown in Example 46 in Table 20, the third red phosphor that has a composition of a MGF phosphor in which a portion of $MgF_2$ is substituted by $CaCl_2$, a portion of Mg of MgO is substituted by K, and a portion of Ge of $GeO_2$ is substituted by B, has a high luminous efficiency. Also, the luminous efficiency of the red phosphor of Example 46 was improved similar to that attained in the red phosphor of Example 11, in which K and B in the red phosphor of Example 46 are Sc and Ga.

As shown in Example 47 in Table 22, the fourth red phosphor that has a composition of a MGF phosphor, in which a portion of $MgF_2$ is substituted by $CaCl_2$ and a portion of Mg of MgO is substituted by Ta, has a high luminous efficiency. Also, the luminous efficiency of the red phosphor of Example 47 was improved similar to that attained in the second red phosphor of Example 2, in which substitution amount of Sc is approximately same as the substitution amount of Ta in the red phosphor of Example 47.

As shown in Example 48 in Table 24, the fifth red phosphor that has a composition of a MGF phosphor in which a portion of $MgF_2$ is substituted by $CaCl_2$ and a portion of Mg of MgO is substituted by Mo, has a high luminous efficiency. Also, the luminous efficiency of the red phosphor of Example 48 was improved similar to that attained in the second red phosphor of Example 11, in which substitution amounts of Sc and Ga are approximately same as the substitution amounts of Mo and Ga in the red phosphor of Example 48.

The red phosphor according to one embodiment of the present disclosure can be used in combination with a lamp to emit ultraviolet light or a light emitting diode to emit near-ultraviolet light or visible light, in a light emitting device that can emit red light with a high efficiency, or in combination with other phosphors in a light emitting device or a display device that can emit various colors of light including mixed-color light of white light. It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A red phosphor represented by formula (1):

$$(x-a-b)\text{MgO}.a\text{M}^1\text{O}.b\text{M}^2\text{O}_{1.5}.y\text{MgF}_2.f\text{M}^6\text{X}_2.(1-g)\text{GeO}_2.g\text{M}^7\text{O}_{1.5}:z\text{Mn}^{4+}$$  (1)

wherein x, y, z, a, b, f, and g satisfy $1.144 < x \leq 11.0$, $0 < y < 1.597$, $0 < z < 0.1$, $0 < a < 1.0$, $0 \leq b \leq 1.0$, $0 < f \leq 2.0$, $0 < g < 0.484$, $1.144 < (x\ a\ b)$;

$M^1$ is at least one element selected from the group consisting of Ca, Sr, Ba, and Zn;

$M^2$ is at least one element selected from the group consisting of Sc, Y, La, Ce, Pr, Nd, Pm, Sm, Eu, Gd, Tb, Dy, Ho, Er, Tm, Yb, and Lu;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and wherein $M^6X_2$ is other than $MgF_2$.

2. The red phosphor according to claim 1, wherein $M^2$ is Sc or Lu and X is Cl or Br.

3. The red phosphor according to claim 2, wherein $M^2$ is Sc or Lu and b satisfies $0 < b \leq 0.495$.

4. The red phosphor according to claim 3, wherein $M^6$ is Ca and X is Cl.

5. The red phosphor according to claim 4, wherein f satisfies $0 < f \leq 1.472$.

6. The red phosphor according to claim 5, wherein $M^7$ is Ga and g satisfies $0 < g \leq 0.295$.

7. The red phosphor according to claim 1, wherein a satisfies $0.094 \leq a \leq 0.462$, and $M^2$ is Sc or Lu and X is Cl or Br.

8. A red phosphor represented by formula (2):

$$(x-b)\text{MgO}.b\text{M}^2\text{O}_{1.5}.y\text{MgF}_2.f\text{M}^6\text{X}_2.(1-g)\text{GeO}_2.g\text{M}^7\text{O}_{1.5}:z\text{Mn}^{4+}$$  (2)

wherein x, y, z, b, f, and g satisfy $1.144 < x \leq 11.0$, $0 < y < 1.597$, $0 < z < 0.1$, $0 \leq b \leq 1.0$, $0 < f \leq 2.0$, $0 \leq g < 0.484$, $1.144 < (x-b)$, and b and g satisfy $b+g \neq 0$;

$M^2$ is at least one element selected from the group consisting of Sc, Y, La, Ce, Pr, Nd, Pm, Sm, Eu, Gd, Tb, Dy, Ho, Er, Tm, Yb, and Lu;

$M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and wherein $M^6X_2$ is other than $MgF_2$ and other than $CaF_2$.

9. The red phosphor according to claim 8, wherein $M^2$ is Sc or Lu and X is Cl or Br.

10. The red phosphor according to claim 9, wherein $M^2$ is Sc or Lu and b satisfies $0 < b \leq 0.495$.

11. The red phosphor according to claim 10, wherein $M^6$ is Ca and X is Cl.

12. The red phosphor according to claim 11, wherein f satisfies $0 < f \leq 1.472$.

13. The red phosphor according to claim 12, wherein $M^7$ is Ga and g satisfies $0 < g \leq 0.295$.

14. The red phosphor according to claim 8, wherein z satisfies $0.001 \leq z \leq 0.049$.

15. A red phosphor represented by formula (3):

$$(x-c)\text{MgO}.c\text{M}^3\text{O}_{0.5}.y\text{MgF}_2.f\text{M}^6\text{X}_2.(1-g)\text{GeO}_2.g\text{M}^7\text{O}_{1.5}:z\text{Mn}^{4+}$$  (3)

wherein x, y, z, c, f, and g satisfy $1.144 < x \leq 11.0$, $0 < y < 1.597$, $0 < z < 0.1$, $0 < c \leq 1.0$, $0 < f \leq 2.0$, $0 \leq g < 0.484$, $1.144 < (x-c)$;

$M^3$ is at least one element selected from the group consisting of Li, Na, and K; and $M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and wherein $M^6X_2$ is other than $MgF_2$ and other than $CaF_2$.

16. The red phosphor according to claim 15, wherein $M^3$ is K and X is Cl or Br.

17. The red phosphor according to claim 16, wherein $M^2$ is Sc or Lu and b satisfies $0 < b \leq 0.495$.

18. A red phosphor represented by formula (4):

$$(x-d)\text{MgO}.d\text{M}^4\text{O}_{2.5}.y\text{MgF}_2.f\text{M}^6\text{X}_2.(1-g)\text{GeO}_2.g\text{M}^7\text{O}_{1.5}:z\text{Mn}^{4+}$$  (4)

wherein x, y, z, d, f, and g satisfy $1.144 < x \leq 11.0$, $0 < y < 1.597$, $0 < z < 0.1$, $0 < d \leq 1.0$, $0 < f \leq 2.0$, $0 \leq g < 0.484$, $1.144 < (x-d)$;

$M^4$ is at least one element selected from the group consisting of V, Nb, and Ta; and $M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and wherein $M^6X_2$ is other than $MgF_2$ and other than $CaF_2$.

19. The red phosphor according to claim 18, wherein $M^4$ is Ta and X is Cl or Br.

20. A red phosphor represented by formula (5):

$$(x-e)\text{MgO}.e\text{M}^5\text{O}_3.y\text{MgF}_2.f\text{M}^6\text{X}_2.(1-g)\text{GeO}_2.g\text{M}^7\text{O}_{1.5}:z\text{Mn}^{4+}$$  (5)

wherein x, y, z, e, f, and g satisfy $1.44 < x \leq 11.0$, $0 < y < 1.597$, $0 < z < 0.1$, $0 < e \leq 1.0$, $0 < f \leq 2.0$, $0 \leq g < 0.484$, $1.144 < (x-e)$;

$M^5$ is at least one element selected from the group consisting of Cr, Mo, and W; and $M^6$ is at least one element selected from the group consisting of Mg, Ca, Sr, Ba, and Zn;

$M^7$ is at least one element selected from the group consisting of B, Al, Ga, and In; and X is at least one element selected from the group consisting of F, Cl, Br, and I; and wherein $M^6X_2$ is other than $MgF_2$ and other than $CaF_2$.

21. The red phosphor according to claim 20, wherein $M^5$ is Mo and X is Cl or Br.

* * * * *

UNITED STATES PATENT AND TRADEMARK OFFICE
CERTIFICATE OF CORRECTION

PATENT NO.        : 10,106,735 B2
APPLICATION NO.   : 15/008210
DATED             : October 23, 2018
INVENTOR(S)       : Masafumi Sakamoto Page 1 of 1

It is certified that error appears in the above-identified patent and that said Letters Patent is hereby corrected as shown below:

In the Claims

Column 29, Line 10:
Please delete "1.144<(x a b)" and insert -- 1.144<(x-a-b) --.

Signed and Sealed this
Nineteenth Day of February, 2019

Andrei Iancu
*Director of the United States Patent and Trademark Office*